US012210796B2

(12) United States Patent
Carrigan et al.

(10) Patent No.: US 12,210,796 B2
(45) Date of Patent: Jan. 28, 2025

(54) DEVICES, METHODS, AND GRAPHICAL USER INTERFACES FOR ENABLING DELIVERY OF AUDIO NOTIFICATIONS

(71) Applicant: Apple Inc., Cupertino, CA (US)

(72) Inventors: Taylor G. Carrigan, San Francisco, CA (US); Andrea V. Simes, San Francisco, CA (US); Heena Ko, San Francisco, CA (US)

(73) Assignee: APPLE INC., Palo Alto, CA (US)

( * ) Notice: Subject to any disclaimer, the term of this patent is extended or adjusted under 35 U.S.C. 154(b) by 451 days.

(21) Appl. No.: 17/724,404

(22) Filed: Apr. 19, 2022

(65) Prior Publication Data

US 2022/0342628 A1 Oct. 27, 2022

Related U.S. Application Data

(60) Provisional application No. 63/180,597, filed on Apr. 27, 2021.

(51) Int. Cl.
 *G06F 3/16* (2006.01)
 *H04M 1/72412* (2021.01)

(52) U.S. Cl.
 CPC .......... *G06F 3/16* (2013.01); *H04M 1/72412* (2021.01)

(58) Field of Classification Search
 CPC ...... G06F 3/01; G06F 3/016; G06F 3/16–167; H04M 1/724–72403;
 (Continued)

(56) References Cited

U.S. PATENT DOCUMENTS 9,264,803 B1 2/2016 Johnson et al.
10,051,107 B1 8/2018 Prasad et al.
(Continued)

FOREIGN PATENT DOCUMENTS

CN 106020763 A 10/2016
CN 107231473 A 10/2017
(Continued)

OTHER PUBLICATIONS

Notice of Allowance, dated Apr. 28, 2022, received in Australian Patent Application No. 2019347704, which corresponds with U.S. Appl. No. 16/575,299, 3 pages.
(Continued)

*Primary Examiner* — Ronald Eisner
(74) *Attorney, Agent, or Firm* — Morgan, Lewis & Bockius LLP

(57) ABSTRACT

An electronic device that is in communication with a display component and wearable audio output devices. Displaying a user interface element for enabling delivery of audio notifications. In response to detecting the input directed to the user interface element: in accordance with a determination that a first application of multiple applications differentiates high-priority notifications from lower-priority notifications, enabling delivery of audio notifications associated with the first application, in accordance with a determination that the first application does not differentiate high-priority notifications from lower-priority notifications, forgoing enabling delivery of audio notifications associated with the first application, in accordance with a determination that a second application differentiates high-priority notifications from lower-priority notifications, enabling delivery of audio notifications from the second application, and in accordance with a determination that the second application does not differentiate high-priority notifications from lower-priority (Continued)

notifications, forgoing enabling delivery of audio notifications from the second application.

51 Claims, 23 Drawing Sheets

(58) Field of Classification Search
CPC ... H04M 1/72448–72457; H04W 4/06; H04W 4/90; H04W 68/00–12
See application file for complete search history.

(56) References Cited

U.S. PATENT DOCUMENTS

| | | | |
|---|---|---|---|
| 10,051,604 | B2 | 8/2018 | Ryu et al. |
| 11,057,866 | B2 | 7/2021 | Ryu et al. |
| 11,093,110 | B1 | 8/2021 | Bossio et al. |
| 11,231,975 | B2 | 1/2022 | Chalmers et al. |
| 2013/0244633 | A1 | 9/2013 | Jacobs et al. |
| 2015/0193098 | A1 | 7/2015 | Kauffmann et al. |
| 2015/0230022 | A1 | 8/2015 | Sakai et al. |
| 2015/0341489 | A1 | 11/2015 | Weksler et al. |
| 2016/0014266 | A1 | 1/2016 | Bhatt |
| 2016/0357510 | A1 | 12/2016 | Watson et al. |
| 2017/0280223 | A1 | 9/2017 | Cavarra et al. |
| 2018/0025325 | A1 | 1/2018 | Bosko et al. |
| 2018/0090143 | A1 | 3/2018 | Saddler et al. |
| 2018/0109751 | A1 | 4/2018 | Choi et al. |
| 2018/0166044 | A1 | 6/2018 | Heo et al. |
| 2018/0268823 | A1* | 9/2018 | Miura .................. G06F 16/635 |
| 2018/0270343 | A1 | 9/2018 | Rout et al. |
| 2018/0359349 | A1 | 12/2018 | Graylin et al. |
| 2020/0033932 | A1 | 1/2020 | Sachs et al. |
| 2020/0066236 | A1 | 2/2020 | Giusti et al. |
| 2020/0104194 | A1 | 4/2020 | Chalmers et al. |
| 2022/0100590 | A1 | 3/2022 | Chalmers et al. |
| 2023/0254401 | A1* | 8/2023 | Nagasaka ................ G08B 3/10 455/418 |

FOREIGN PATENT DOCUMENTS

| | | |
|---|---|---|
| CN | 108292203 A | 7/2018 |
| CN | 108604178 A | 9/2018 |
| KR | 20140147557 A | 12/2014 |
| KR | 20150135057 A | 12/2015 |
| WO | WO 2018169763 A1 | 9/2018 |

OTHER PUBLICATIONS

Certificate of Grant, dated Sep. 1, 2022, received in Australian Patent Application No. 2019347704, which corresponds with U.S. Appl. No. 16/575,299, 3 pages.

Office Action, dated May 8, 2023, received in European Patent Application No. 19782853.6, which corresponds with U.S. Appl. No. 16/575,299, 10 pages.

Office Action, dated Dec. 14, 2022, received in Indian Patent Application No. 202117009676, 9 pages.

Office Action, dated May 6, 2022, received in Japanese Patent Application No. 2021-510170, which corresponds with U.S. Appl. No. 16/575,299, 2 pages.

Patent, dated May 20, 2022, received in Japanese Patent Application No. 2021-510170, which corresponds with U.S. Appl. No. 16/575,299, 2 pages.

Office Action, dated Sep. 25, 2022, received in Korean Patent Application No. 2021-7004686, which corresponds with U.S. Appl. No. 16/575,299, 11 pages.

Office Action, dated May 24, 2023, received in U.S. Appl. No. 17/549,804, 20 pages.

Office Action, dated Oct. 27, 2020, received in U.S. Appl. No. 16/575,299, 17 pages.

Office Action, dated Mar. 24, 2021, received in U.S. Appl. No. 16/575,299, 18 pages.

Notice of Allowance, dated Oct. 15, 2021, received in U.S. Appl. No. 16/575,299, 18 pages.

Office Action, dated Oct. 11, 2021, received in Australian U.S. Appl. No. 16/575,299, which corresponds with U.S. Appl. No. 16/575,299, 3 pages.

Invitation to Pay Additional Fees, dated Jan. 9, 2020, received in International Patent Application No. PCT/US2019/052239, which corresponds with U.S. Appl. No. 16/575,299, 15 pages.

Office Action, dated Jan. 20, 2024, received in Chinese U.S. Appl. No. 16/575,299, which corresponds with U.S. Appl. No. 16/575,299, 2 pages.

Patent, dated May 19, 2023, received in Korean Patent Application No. 2021-7004686, which corresponds with U.S. Appl. No. 16/575,299, 4 pages.

Final Office Action, dated Aug. 24, 2023, received in U.S. Appl. No. 17/549,804, 20 pages.

Office Action, dated Jun. 26, 2023, received in Japanese Patent Application No. 2022-081683, which corresponds with U.S. Appl. No. 17/549,804, 2 pages.

Office Action, dated Jan. 11, 2024, received in Korean Patent Application No. 2023-7017055, which corresponds with U.S. Appl. No. 17/549,804, 9 pages.

Notice of Allowance, dated Jan. 29, 2024, received in U.S. Appl. No. 17/549,804, 9 pages.

Office Action, dated May 30, 2023, received in Australian Patent Application No. 2022218518, which corresponds with U.S. Appl. No. 17/549,804, 3 pages.

Notice of Allowance, dated Jan. 15, 2024, received in Australian Patent Application No. 2022218518, which corresponds with U.S. Appl. No. 17/549,804, 5 pages.

Patent, dated Apr. 15, 2024, received in Japanese Patent Application No. 2022-081683, which corresponds with U.S. Appl. No. 17/549,804, 4 pages.

Office Action, dated Jul. 9, 2024, received in Chinese Patent Application No. 22190375.0, which corresponds with U.S. Appl. No. 16/575,299, 1 page.

\* cited by examiner

Application: Coffee Shop          Displayed Notification          Audio Notification High-Priority Coffee Shop Notification: "Order is ready at the counter." 556-1

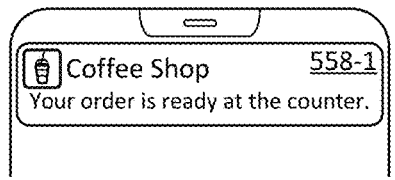
Coffee Shop 558-1
Your order is ready at the counter.

"Your Coffee Shop order is ready at the counter." 560-1

Audio Notifications 552-1: Enabled
High Priority Notifications Only 554-1: Yes

Application: Coffee Shop          Displayed Notification          Audio Notification Coffee Shop Notification: "You earned a $5 Coupon on your next order." 556-2

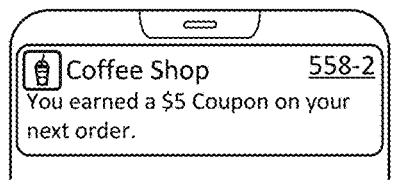
Coffee Shop 558-2
You earned a $5 Coupon on your next order.

(no audio notification)
560-2

Audio Notifications 552-2: Enabled
High Priority Notifications Only 554-2: Yes

Application: Coffee Shop          Displayed Notification          Audio Notification High-Priority Coffee Shop Notification: "Order is ready at the counter." 556-3

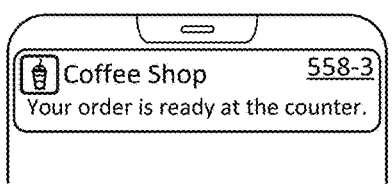
Coffee Shop 558-3
Your order is ready at the counter.

(no audio notification)
560-3

Audio Notifications 552-3: Disabled
High Priority Notifications Only 554-3: N/A

Application: Coffee Shop          Displayed Notification          Audio Notification Coffee Shop Notification: "You earned a $5 Coupon on your next order." 556-4

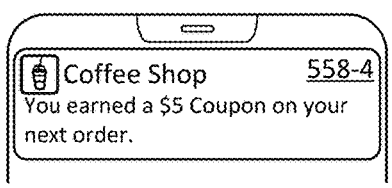
Coffee Shop 558-4
You earned a $5 Coupon on your next order.

(no audio notification)
560-4

Audio Notifications 552-4: Disabled
High Priority Notifications Only 554-4: N/A

Figure 5K-4

Application: Coffee Shop       Displayed Notification         Audio Notification

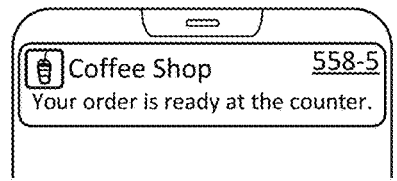

Audio Notifications 552-5: Enabled
High Priority Notifications Only 554-5: No

Application: Coffee Shop       Displayed Notification         Audio Notification

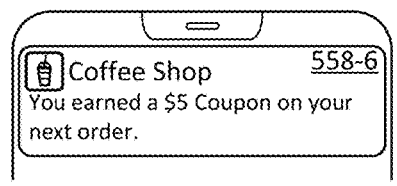

Audio Notifications 552-6: Enabled
High Priority Notifications Only 554-6: No

Application: Shopping          Displayed Notification         Audio Notification

Audio Notifications 552-7: Enabled
High Priority Notifications Only 554-7: No

Application: Shopping          Displayed Notification         Audio Notification

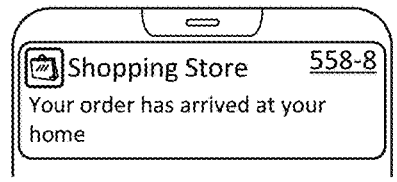

Audio Notifications 552-8: Enabled
High Priority Notifications Only 554-8: No

Figure 5K-8

Application: Mail     Displayed Notification     Audio Notification

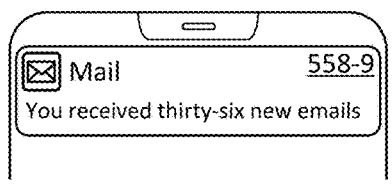

Mail Notification: "You received thirty-six new emails." 556-9

Mail 558-9 — You received thirty-six new emails (no audio notification) 560-9

Audio Notifications 552-9: Disabled
High Priority Notifications Only 554-9: N/A

Application: Mail     Displayed Notification     Audio Notification

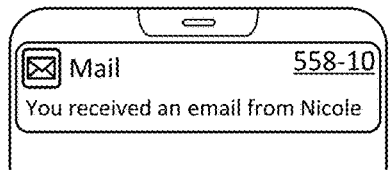

Mail Notification: "You received an email from Nicole." 556-10

Mail 558-10 — You received an email from Nicole (no audio notification) 560-10

Audio Notifications 552-10: Disabled
High Priority Notifications Only 554-10: N/A

Application: Maps     Displayed Notification     Audio Notification

Maps Notification: "Turn right in 30 meters." 556-11

(display off) 558-11

Turn right in 30 meters. 560-11

Audio Notifications 552-11: Enabled
High Priority Notifications Only 554-11: Yes

Application: Maps     Displayed Notification     Audio Notification

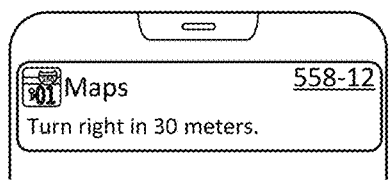

Maps Notification: "Turn right in 30 meters." 556-12

Maps 558-12 — Turn right in 30 meters.

Turn right in 30 meters. 560-12

Audio Notifications 552-12: Enabled
High Priority Notifications Only 554-12: Yes

602 At an electronic device that is in communication with a display generation component and one or more wearable audio output devices

604 Displaying, via the display generation component, a user interface that includes a user interface element for enabling delivery of audio notifications, via the one or more wearable audio output devices, wherein the audio notifications for which delivery is enabled are associated with a plurality of applications on the electronic device

606 Detecting a first input directed to the user interface element

608 In response to detecting the first input directed to the user interface element

610 In accordance with a determination that a first application of multiple applications differentiates high-priority notifications from lower-priority notifications, enabling delivery of audio notifications associated with the first application

612 In accordance with a determination that the first application does not differentiate high-priority notifications from lower-priority notifications, forgoing enabling delivery of audio notifications associated with the first application

614 In accordance with a determination that a second application of the multiple applications differentiates high-priority notifications from lower-priority notifications, enabling delivery of audio notifications from the second application

616 in accordance with a determination that the second application does not differentiate high-priority notifications from lower-priority notifications, forgoing enabling delivery of audio notifications from the second application

618 In response to detecting the first input directed to the user interface element, determining for each respective application of the multiple applications whether or not the respective application is permitted to deliver audio notifications

---

620 In response to detecting the first input directed to the user interface element, in accordance with a determination that a third application of the multiple applications does not differentiate high-priority notifications from lower-priority notifications, forgoing enabling delivery of audio notifications by the third application

---

622 High priority notifications include notifications that are identified by the application as being time sensitive notifications

---

624 High priority notifications are notifications identified by an application as having high priority

---

626 After determining that the first application does not differentiate high-priority notifications from lower-priority notifications, and forgoing enabling delivery of audio notifications by the first application:
    detecting a second input directed to another user interface element associated with the first application; and
    in response to detecting the second input, enabling delivery of audio notifications for the first application

---

628 The user interface that includes the user interface element for enabling delivery of the audio notifications is a settings user interface for the electronic device

---

630 The user interface that includes the user interface element for enabling delivery of the audio notifications is displayed while setting up the one or more wearable audio output devices for use with the electronic device

632 The user interface is a settings user interface, and the method includes:
  detecting a second input directed to another user interface element associated with the first application; and
  in response to detecting the second input, displaying a notification control user interface associated with the first application, wherein displaying the notification control user interface includes concurrently displaying:
    a first user interface element for enabling delivery of a subset of notifications associated with the respective application as audio notifications; and
    a second user interface element for enabling delivery of a larger set of notifications associated with the respective application

---

634 Before displaying a user interface that includes a user interface element for enabling delivery of audio notifications via the one or more wearable audio output devices, displaying another user interface that includes a first user interface element for enabling a default set of applications to deliver audio notifications, and a second user interface element for selecting which applications are enabled to deliver audio notifications.

---

636 Detecting an input at the second user interface element for selecting which applications deliver audio notifications user interface element; and
  in response to detecting the input at the second user interface element, displaying a user interface that includes respective user interface elements for enabling delivery of audio notifications for a plurality of different applications

---

638 Detecting an input at the first user interface element for enabling the default set of applications to deliver audio notifications; and
  in response to detecting the input at the first user interface element, enabling delivery of audio notifications for applications designated as default applications, wherein the default applications are applications that differentiate high-priority notifications from lower-priority notifications.

640 Default applications deliver audio notifications for notifications designated as being high priority notifications without delivering audio notifications for notifications that are not designated as being high priority notifications

642 Enabling delivery of audio notifications associated with the first application 644 Enabling delivery of audio notifications by the first application; and
    while the electronic device is outputting ongoing audio via the one or more wearable audio output devices, responding to an audio notification associated with the first application being ready for delivery by:
        delivering the audio notification associated with the first application via the one or more audio output devices; and
        while delivering the audio notification associated with the first application, interrupting output of the ongoing audio via the one or more audio output devices 646 Enabling delivery of audio notifications by the first application; and while delivery of audio notifications by the first application is enabled, responding to an audio notification associated with the first application being ready for delivery by:
    delivering an introductory sound; and
    after delivering the introductory sound, delivering the audio notification associated with the first application via the one or more audio output devices 648 Enabling delivery of audio notifications associated with the first application; and
    while delivery of audio notifications associated with the first application is enabled, responding to an audio notification associated with the first application being ready for delivery by delivering the audio notification associated with the first application and displaying, via the display generation component, a visual notification associated with the first application

650 The user interface is a settings user interface, and the method includes:
  detecting a second input directed to another user interface element associated with the first application, wherein the first application is a communication application; and
  in response to detecting the second input, displaying a notification control user interface associated with the first application, wherein the notification control user interface includes a plurality of selectable user interface elements, including one or more selectable user interface element for enabling delivery of audio notifications associated with the first application and meeting predefined criteria including filter criteria associated with at least one of: favorite entities, entities associated with recent communications, contacts associated with a user of the electronic device, or all entities

Figure 6E

DEVICES, METHODS, AND GRAPHICAL USER INTERFACES FOR ENABLING DELIVERY OF AUDIO NOTIFICATIONS

RELATED APPLICATIONS

This application claims priority to U.S. Provisional Patent Application No. 63/180,597, filed Apr. 27, 2021, which is hereby incorporated by reference in its entirety.

TECHNICAL FIELD

This relates generally to provide notifications as audio notifications delivered by a computer system or electronic device to one or more wearable audio output devices.

BACKGROUND

Notifications provided by electronic devices have traditionally been configured to be displayed on a display component of an electronic device. These notifications have traditionally been configured to notify a user of a received message or other event irrespective of the notification's importance. However, with growing storage capabilities and increased number of applications installed on electronic devices, the number of notifications received by a typical electronic device has greatly increased, and in some cases are too numerous to be useful to the user of the electronic device. Aggregating notifications, while reducing user interruption, other still requires a user to determine which notifications are indeed worth their time to review. Another issue with conventional methods of handling notifications is failure to distinguish between important notifications and other notifications, relying on users to make the determination as to which notifications are important. In addition, conventional methods take longer and require more user interaction than necessary to identify and inform the user of important notifications, thereby wasting the user's time and energy of the electronic device. This latter consideration is particularly important in battery-operated devices. Further, audio notifications, which typically take much more of a user's time to review than displayed notifications, are typically not used, or limited to specific use cases, as a result of the aforementioned issues with conventional methods.

SUMMARY

Accordingly, there is a need for electronic devices with faster, more efficient methods and interfaces for enabling delivery of high-priority notifications as audio notifications and forgoing delivering lower-priority notifications as audio notifications. Such methods and interfaces optionally complement or replace conventional methods for providing notifications to the user of a computer system or electronic device. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with delivering notifications as audio notifications are reduced or eliminated by the disclosed computer system. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system includes (and/or is in communication with) the wearable audio output devices (e.g., in-ear earphones, earbuds, over-ear headphones, etc.). In some embodiments, the computer system has (and/or is in communication with) a touch-sensitive surface (also known as a "touchpad"). In some embodiments, the computer system has (and/or is in communication with) a display device, which in some embodiments is a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, audio output device pairing, enabling audio notifications for audio output devices, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with a display generation component and one or more wearable audio output devices. The method includes displaying, via the display generation component, a user interface that includes a user interface element for enabling delivery of audio notifications, via the one or more wearable audio output devices, wherein the audio notifications for which delivery is enabled are associated with a plurality of applications on the electronic device. The method includes, detecting a first input directed to the user interface element. The method also includes, in response to detecting the first input directed to the user interface element, in accordance with a determination that a first application of multiple applications differentiates high-priority notifications from lower-priority notifications, enabling delivery of audio notifications associated with the first application. The method further includes, in response to detecting the first input directed to the user interface element, in accordance with a determination that the first application does not differentiate high-priority notifications from lower-priority notifications, forgoing enabling delivery of audio notifications associated with the first application. The method includes, in accordance with a determination that a second application of the multiple applications differentiates high-priority notifications from lower-priority notifications, enabling delivery of audio notifications from the second application. The method includes, in accordance with a determination that the second application does not differentiate high-priority notifications from lower-priority notifications, forgoing enabling delivery of audio notifications from the second application.

In accordance with some embodiments, a computer system includes or is in communication with one or more wearable audio output devices, a display device, optionally a touch-sensitive surface, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system as described herein, cause the computer system to perform or cause performance of the operations of any of the methods described herein. In accordance with some embodiments, a graphical user interface produced by a computer system as described herein includes one or more of the elements displayed in any of the methods described herein, which are updated in response to inputs, as described in any of the methods described herein. In accordance with some embodiments, a computer system as described herein includes means for performing or causing performance of the operations of any of the methods described herein. In accordance with some embodiments, an information processing apparatus, for use in a computer system as described herein, includes means for performing or causing performance of the operations of any of the methods described herein.

In accordance with some embodiments, a wearable audio output device as described herein includes one or more microphones, optionally an input device (e.g., which may be pressure-sensitive and/or touch-sensitive), optionally one or more attachments (e.g., in-ear eartips), optionally one or more sensors for detecting placement of the wearable audio output device in a user's ear, one or more processors, and memory storing one or more programs; the one or more programs are configured to be executed by the one or more processors and the one or more programs include instructions for performing or causing performance of the various operations associated with outputting audio to a user of the wearable audio output device.

Thus, computer systems that include or are in communication with one or more wearable audio output devices, a display device, and optionally a touch-sensitive surface, are provided with improved methods and interfaces for delivering high-priority audio notifications as opposed to lower-priority notifications, thereby increasing the effectiveness, efficiency, and user satisfaction with such systems and devices. Such methods and interfaces may complement or replace conventional methods for delivering notifications at either the electronic device or the wearable audio output devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of enabling multi-application audio notifications, via an electronic device, and delivery of audio notifications, via wearable audio output devices, in accordance with some embodiments.

DESCRIPTION OF EMBODIMENTS

As noted above, audio output devices such as wearable audio output devices can be leveraged to provide high-priority notifications as audio notifications to a user without distracting them with lower-priority notifications. Many computer systems that include or are in communication with wearable audio output devices fail to utilize the wearable audio devices for delivering notifications. The methods, systems, and user interfaces/interactions described herein improve how notifications are delivered to a user in multiple ways. For example, embodiments disclosed herein describe ways of delivering notifications from applications as audio notifications and ways to determine which notifications from respective applications are permitted to be delivered as audio notifications.

Figure 4A:
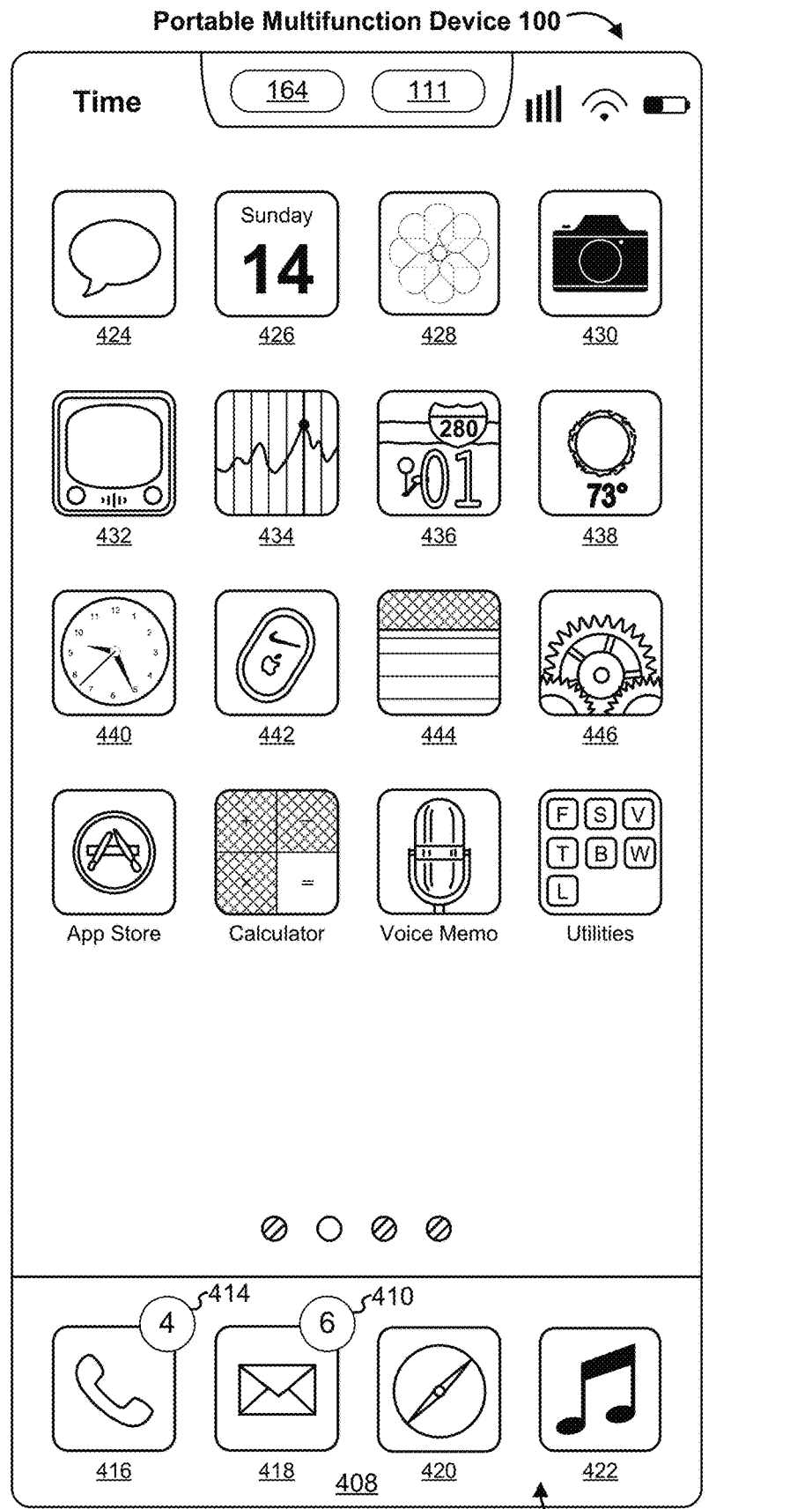
FIG. 4A illustrates an example user interface for a menu of applications on a portable multifunction device in accordance with some embodiments.
Figure 4B:
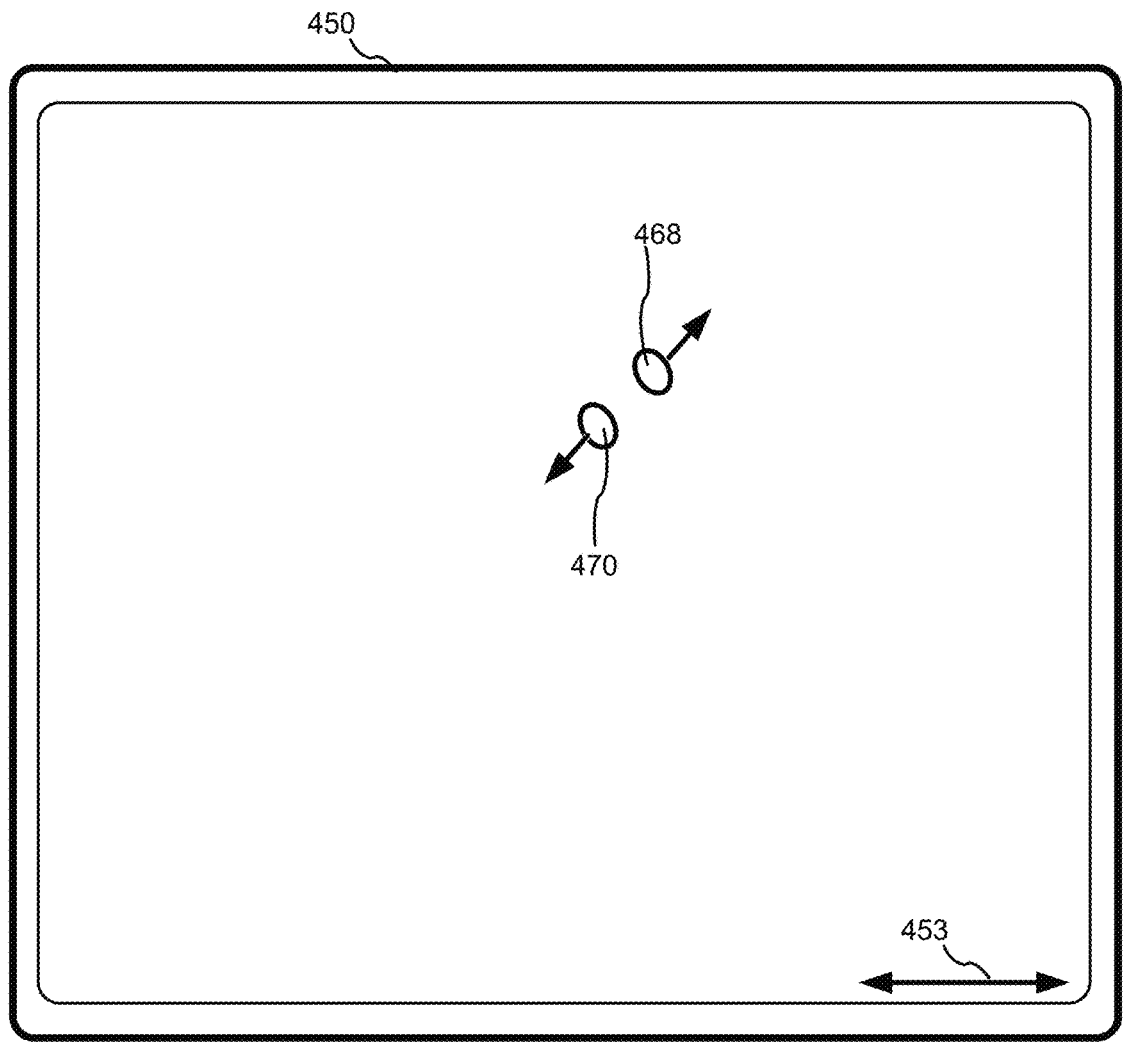
FIG. 4B illustrates an example user interface for a multifunction device with a touch-sensitive surface that is separate from the display in accordance with some embodiments.
Figure 5A:
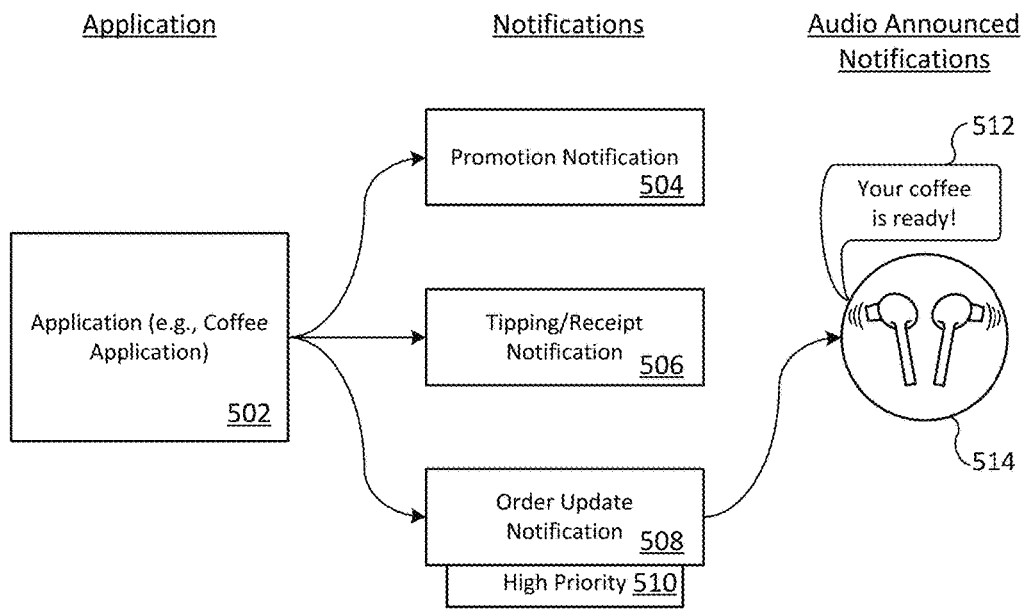
FIGS. 5A-5N illustrate example user interfaces for how multi-application audio notifications are enabled, via an electronic device, and delivered via wearable audio output devices, in accordance with some embodiments.

Below, FIGS. 1A-1B, 2, and 3A-3C provide a description of example devices and examples of their operation. FIGS. 4A-4B illustrate example user interface for example devices on which the embodiments disclosed herein are implemented. FIGS. 5A-5N illustrate example user interfaces for delivering audio notifications to a user via wearable audio output devices and for determining which notifications are to be delivered as audio notifications. The user interfaces and user interactions shown in FIGS. 5A-5N are used to illustrate the processes depicted in FIGS. 6A-6E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise. In another example, a first audio output could be termed a second audio output, and, similarly, a second audio output could be termed a first audio output, without departing from the scope of the various described embodiments. Again, the first audio output and the second audio output are both audio outputs, but they are not the same audio output, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of computer systems that include or are in communication with wearable audio output devices, user interfaces for such systems, and associated processes for using such systems and devices are described. In some embodiments, the computer system includes a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the computer system is not a portable communications device, but is a desktop computer with a touch-sensitive surface (e.g., a touch-screen display and/or a touchpad).

In the discussion that follows, a computer system that includes an electronic device with a display device and a touch-sensitive surface is described. It should be understood, however, that the computer system optionally includes one or more other physical user-interface devices, such as a display that is not touch-sensitive, a physical keyboard, a mouse and/or a joystick.

The computer system typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the computer system optionally use at least one common physical user-interface device, such as the touch-sensitive surface. One or more functions of the touch-sensitive surface as well as corresponding information displayed on the computer system are, optionally, adjusted and/or varied from one application to the next and/or within a respective application. In this way, a common physical architecture (such as the touch-sensitive surface) of the computer system optionally supports the variety of applications with user interfaces that are intuitive and transparent to the user.

Figure 1A:
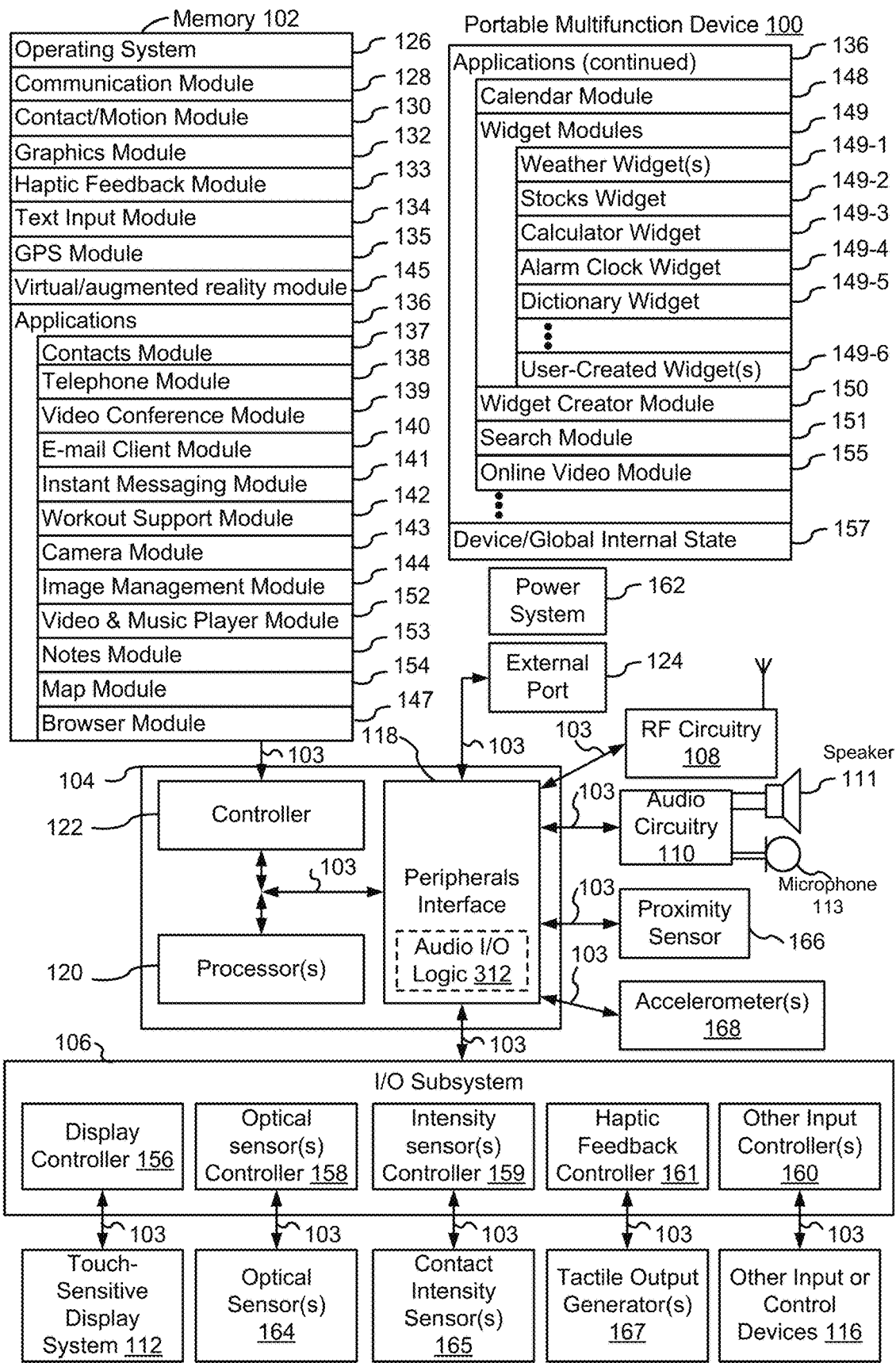
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 (sometimes herein called a computer system) with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a movable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone). In some embodiments, RF circuitry 108 provides an interface between audio circuitry 110 and one or more wearable audio input/output peripherals, such as output-only headphones, a headset with both output (e.g., a headphone for one or both ears) and input (e.g., one or more microphones), or one or more wireless audio output devices, as described elsewhere in this document.

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., or an up button and a separate down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. In some embodiments, touch-sensitive display system 112 or display controller 156, or a combination of touch-sensitive display 112 and display controller 156, are referred to as a display generation component of device 100. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen. Furthermore, in some embodiments, in place of a touch screen, or in addition to a touch screen, device 100 includes a display generation component (e.g., a display driver, for displaying images using a peripheral device, such as display or headset with a holographic image generation component) and a device, such as a touchpad, with a touch-sensitive surface, and/or other input device(s), such as a voice recognition device or subsystem for receiving orally delivered user inputs, and/or a user gaze determination device or subsystem that determines a location (e.g., in a user interface, or in a two or three dimensional environment) or sequence of locations at which a user is gazing or focusing, and thus receives or determines inputs in the form of gestures performed with the user's gaze (e.g., the user input may include gazing at or focusing on a respective user interface element, moving the user's gaze position along a path or trajectory, blinking the user's eyes, and other gaze based inputs).

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and/or a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device 100 and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
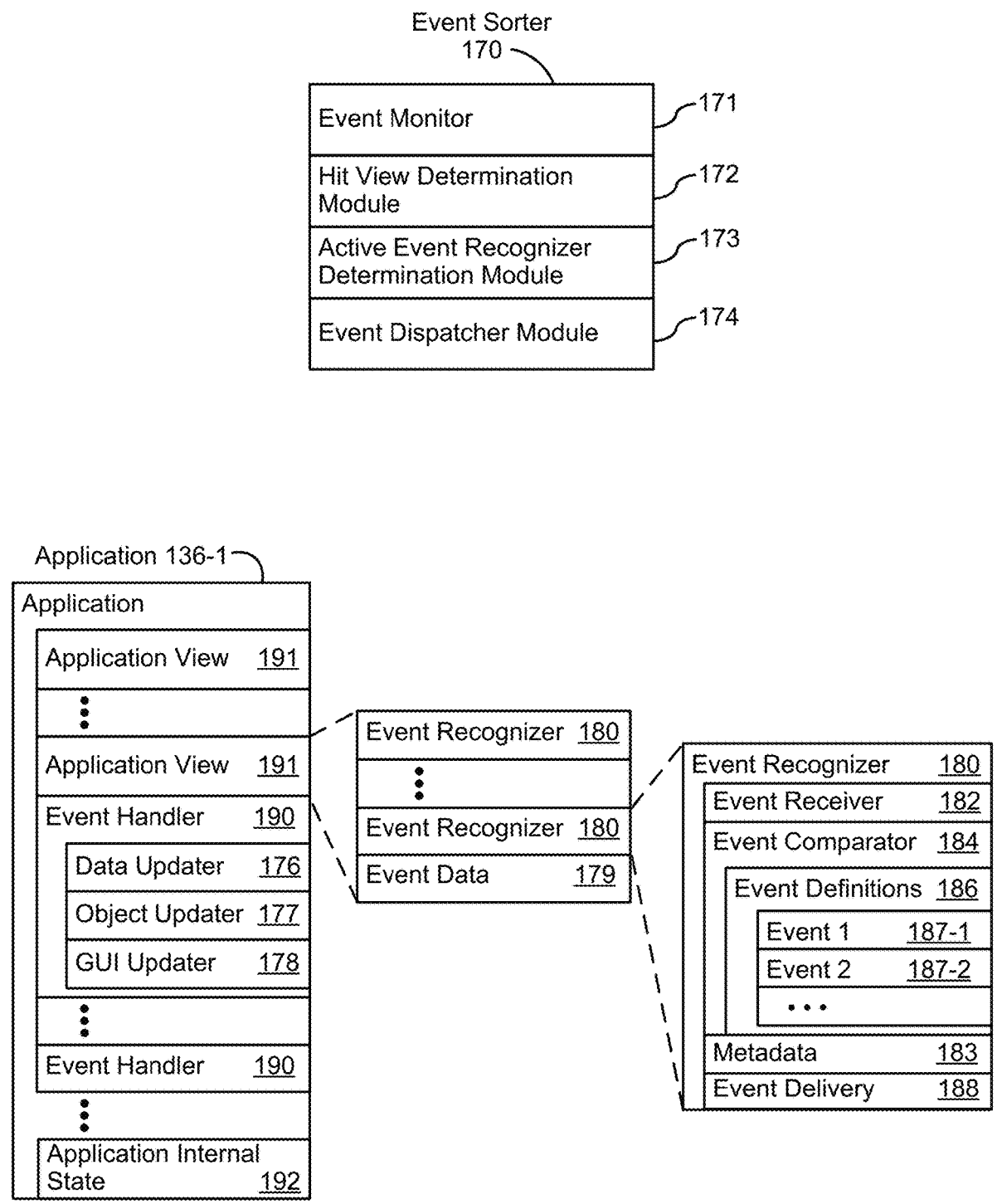
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
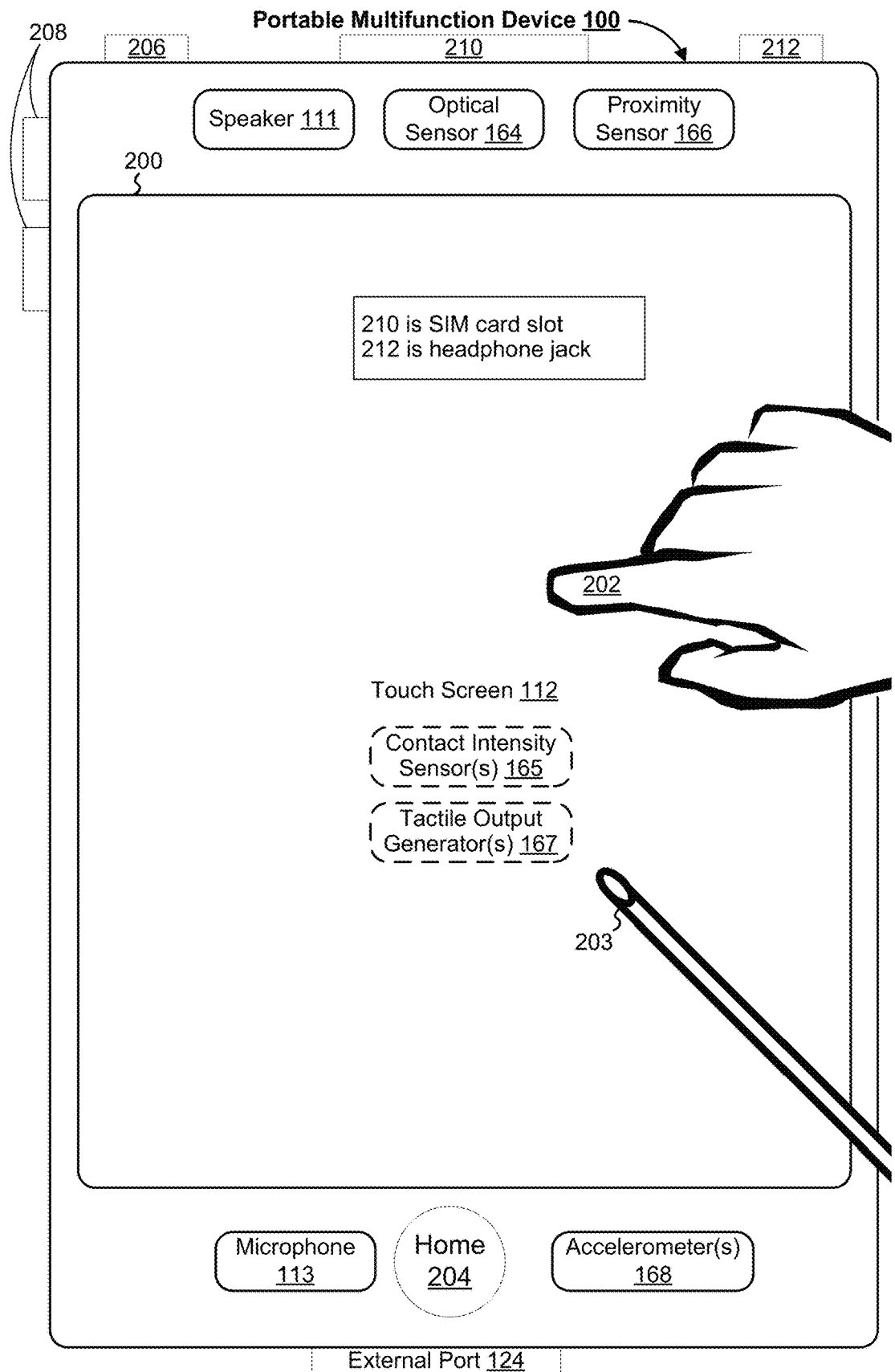
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
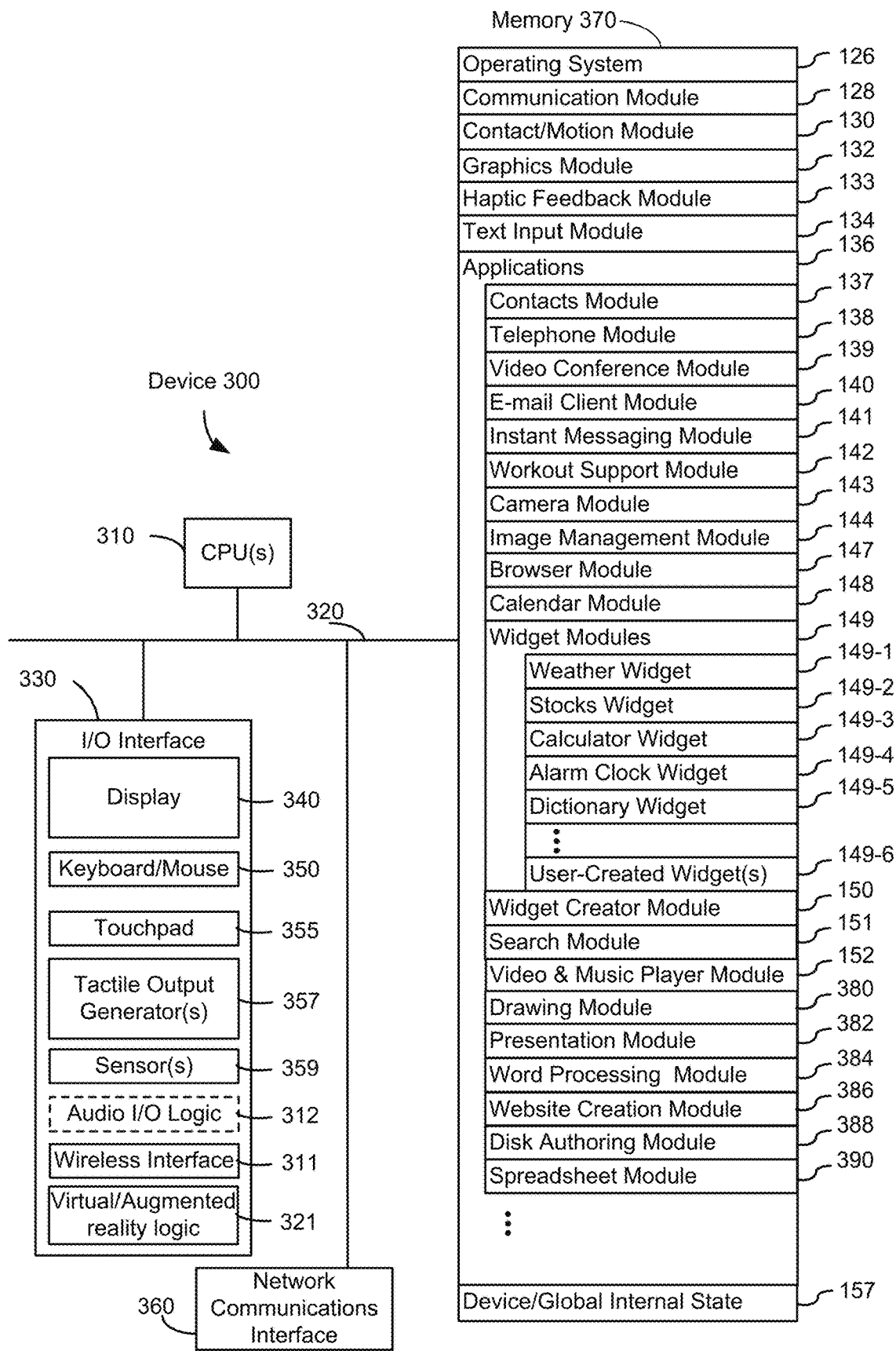
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, a virtual reality system, an augmented reality system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. In some embodiments, display 340 is referred to as a display generation component. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301.

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
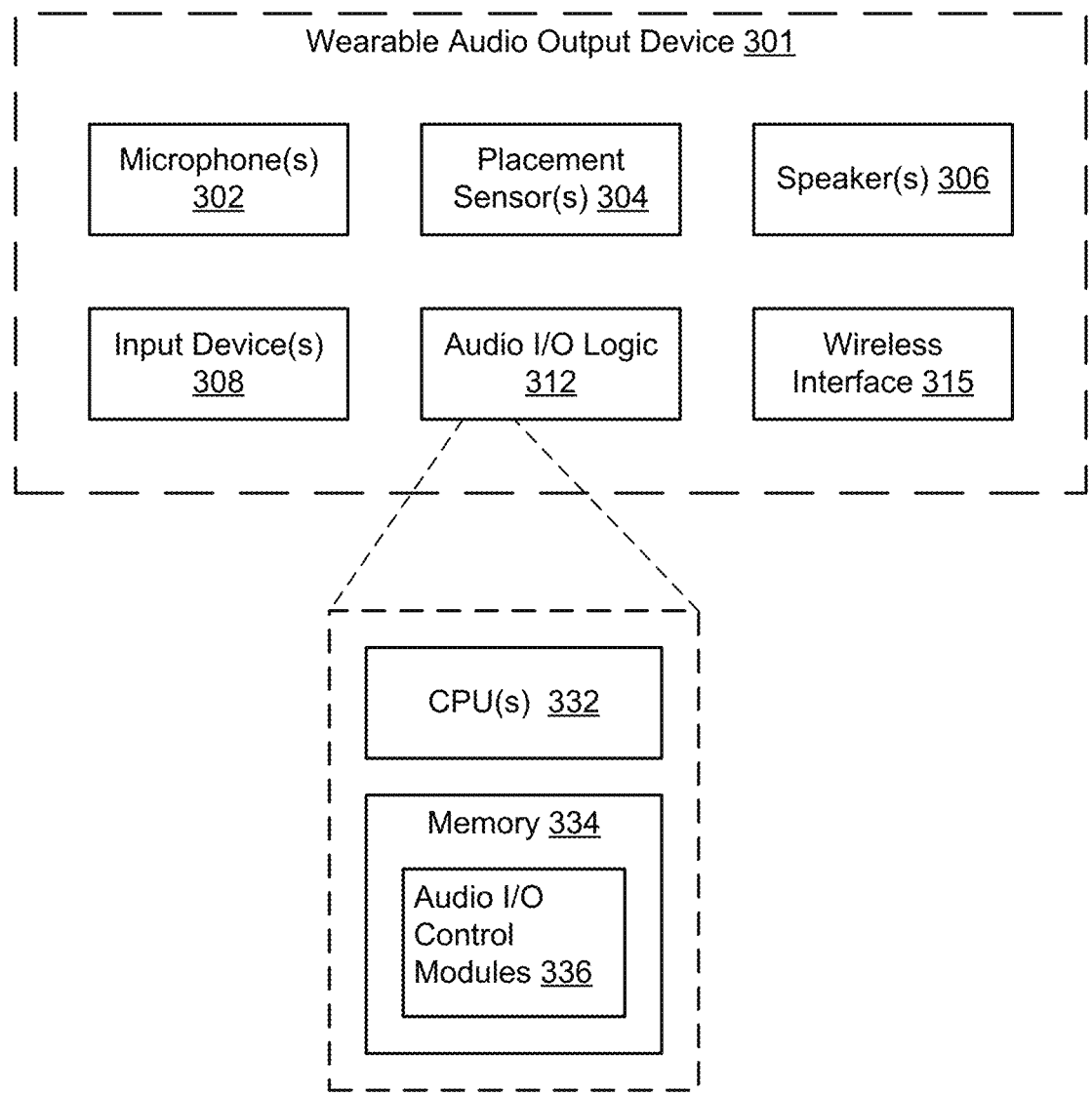
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 is a single earphone or earbud. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, so as to reduce power usage). In some embodiments where wearable audio output device 301 includes multiple (e.g., a pair) of wearable audio output components (e.g., earphones or earbuds), each component includes one or more respective placement sensors, and wearable audio output device 301 conditionally outputs audio based on whether one or both components is in or near a user's ear, as described herein. In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with a multifunction device, such as device 300 (FIG. 3A).

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

Figure 3C:
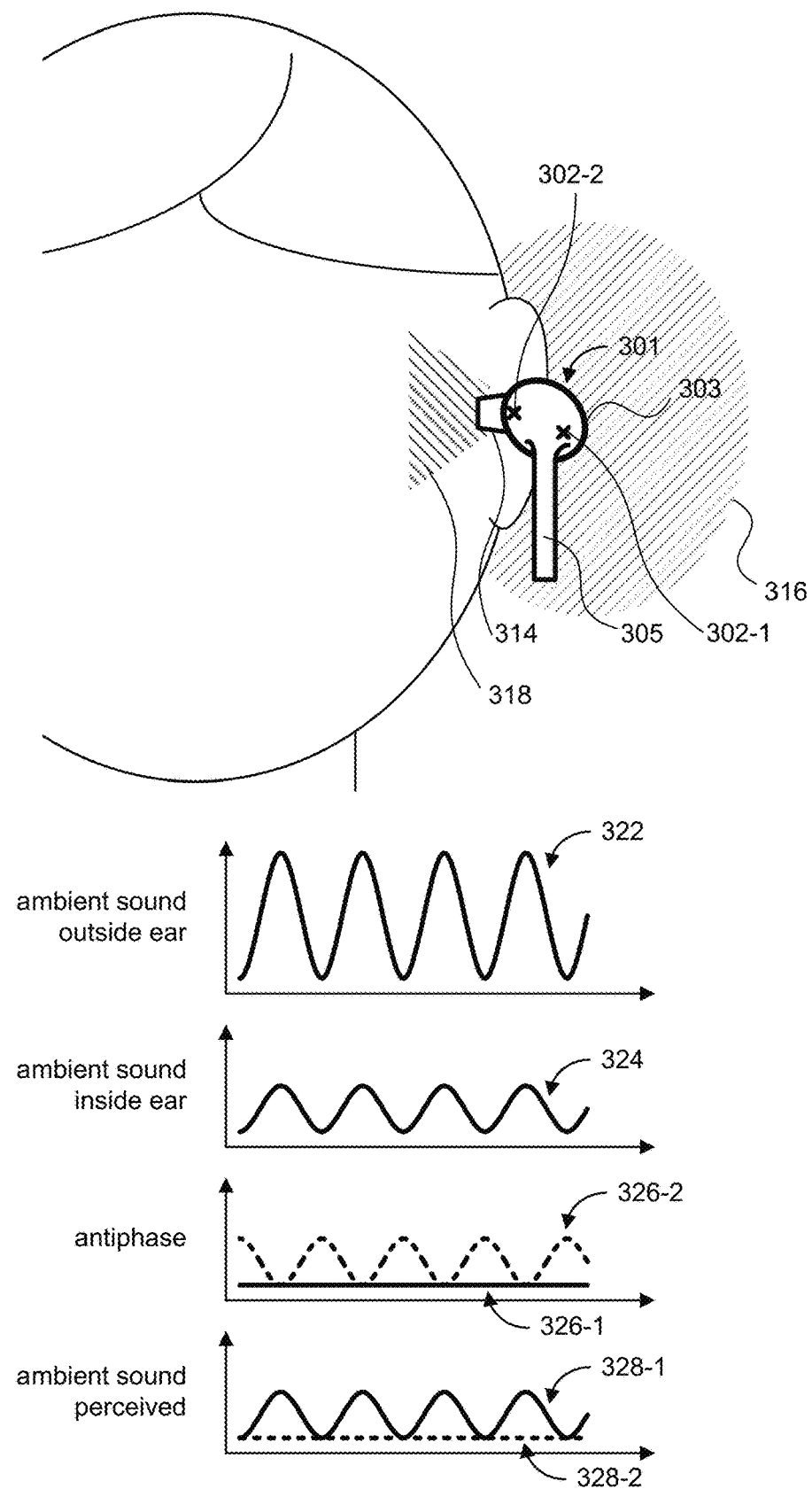
FIG. 3C illustrates example audio control by a wearable audio output device in accordance with some embodiments.

In some embodiments, wearable audio output device 301 includes one or more input devices 308. In some embodiments where wearable audio output device 301 includes multiple (e.g., a pair) of wearable audio output components (e.g., earphones or earbuds), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

FIG. 3C illustrates example audio control by a wearable audio output device in accordance with some embodiments. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3C, wearable audio output device 301 is worn by a user such that earbud 303 and eartip 314 are in the user's left ear. Eartip 314 extends at least partially into the user's ear canal. Preferably, when earbud 303 and eartip 314 are inserted into the user's ear, a seal is formed between eartip 314 and the user's ear so as to isolate the user's ear canal from the surrounding physical environment. However, in some circumstances, earbud 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earbud 303. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earbud 303 and eartip 314 and that can be heard in region 318 inside the user's ear canal. Accordingly, in some circumstances in which wearable audio output device 301 is not producing a noise-canceling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-canceling audio components (e.g., one or more antiphase audio signals, also called "audio-cancellation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-canceling audio components nor any pass-through audio components (e.g., such that any amount of ambient sound that the user perceives is due to physical attenuation by wearable audio output device 301).

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although in some examples, inputs may be received on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

User Interfaces and Associated Processes

Attention is now directed towards embodiments of user interfaces ("UI") and associated processes that may be implemented on a computer system (e.g., that includes an electronic device such as portable multifunction device 100, FIG. 1A, or device 300, FIG. 3A) with a display device (e.g., touch-sensitive display system 112, FIG. 1A, or display 340, FIG. 3A) and a touch-sensitive surface (e.g., touch-sensitive display system 112, FIG. 1A, or touchpad 355, FIG. 3A), and that includes or is in communication with one or more wearable audio output devices (e.g., one or more wearable audio output devices 301).

FIGS. 5A-5N illustrate example user interfaces for enabling delivery of multi-application audio notifications by a computer system, via wearable audio output devices, in accordance with some embodiments. The user interfaces in these figures are used to illustrate the processes described below, including the processes described with respect to FIGS. 6A-6E. For convenience of explanation, some of the embodiments will be discussed with reference to operations performed by a computer system (e.g., an electronic device) in communication with one or more wearable audio output devices (e.g., worn by a user) and a display generation component, such as a touch-sensitive display system 112 or a display 340 that is separate from a touch-sensitive input device such as touchpad 355.

FIG. 5A illustrates an exemplary flow diagram that generally describes how some notifications are delivered as audio notifications while other notifications are not delivered as audio notifications. In this context, an audio notification is a notification having textual content that is spoken by a computer system, such as by a digital assistant of the computer system. Depending on the context and/or circumstances, audio notifications are delivered instead of or in addition to visual/textual notifications, haptic notifications, and/or ringing notifications, etc. In some embodiments, high-priority notifications are delivered as audio notifications and lower-priority notifications are not delivered as audio notifications.

Specifically, FIG. 5A illustrates examples of notifications that are delivered as audio notifications and notifications that are not delivered as audio notifications. Moving from left to right, FIG. 5A first indicates that an application illustrated by flow box 502 (e.g., a "Coffee Shop" application) is configured to provide notifications to a user of a computer system (e.g., portable multifunction device 100).

Flow box 504, 506, and 508 all indicate different types of notifications that the application identified in flow box 502 is configured to deliver. In this example, box 504 corresponds to a "Promotion Notification," box 506 corresponds to a "Tipping/Receipt Notification," and box 508 corresponds to an "Order Update Notification." However, only box 508 which corresponds to an "Order Update Notification" is designated as being a "High-Priority" notification (e.g., as indicated by box 510). In this example embodiment, a high-priority notification is also a time-sensitive notification (e.g., the relevancy of the notification will be diminished if not promptly made known to a user of the electronic device). Thus, in this example, the order update notification is marked as a high-priority notification because it is time-sensitive (e.g., when the user's order is ready, it is important to timely inform the user). While a coffee shop application may designate an order update as being high-priority, other applications may deem other notifications as being high-priority (e.g., a shipping application may mark a delivery notification as being high-priority).

FIG. 5A further illustrates that notifications designated as high-priority are delivered as audio notifications. For example, since the "Order Update Notification" is designated as being a high-priority notification (e.g., as shown by box 510), a corresponding audio notification 512 is delivered to the wearable audio output devices (e.g., as indicated by icon 514, and also referred to as earbuds 516-1 and 516-2), whereas the other notifications (e.g., notifications indicated by box 504 and box 506) are not delivered as audio notifications. However, these notifications indicated by box 504 and box 506 may still be delivered as another form of notification (e.g., textual/visual, haptic, etc.,)

FIGS. 5B-5J illustrate example user interfaces for enabling audio notifications and configuring audio notifications while, or in response to, initializing communication between the wearable audio output devices (also referred to as peripherals (e.g., earbuds 516-1 and 516-2 as well as earbud case 516-3)) and portable multifunction device 100.

Figure 5B:
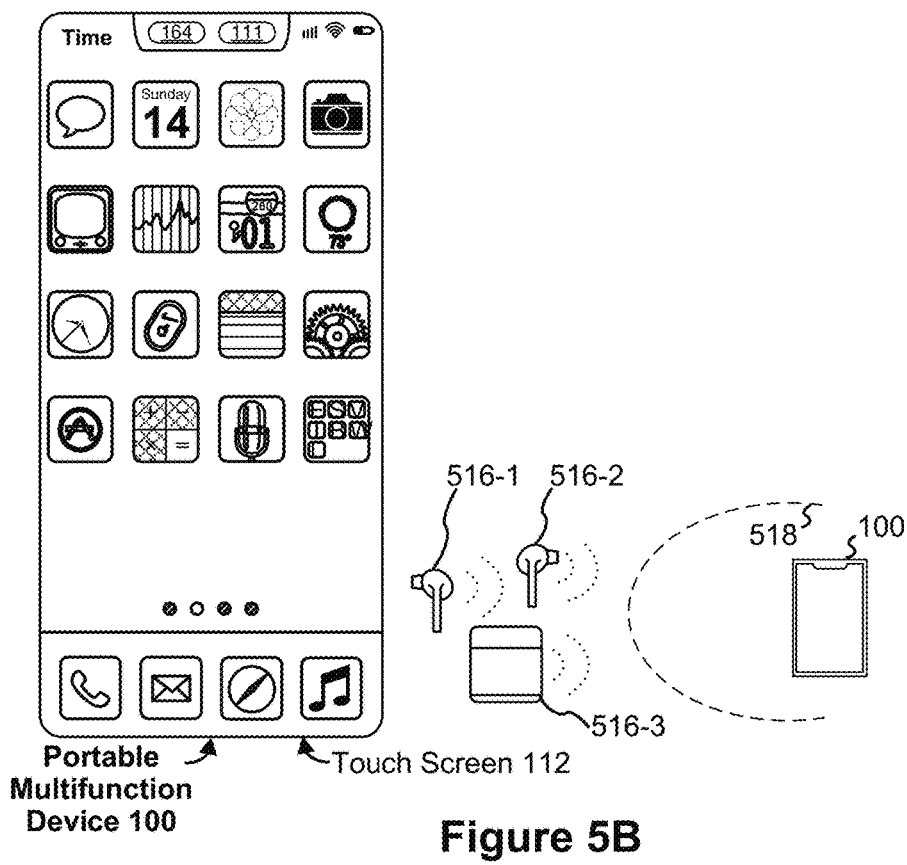

FIG. 5B illustrates an example user interface (e.g., a home screen user interface, sometimes called an application launch user interface, that includes application icons for a plurality of applications) on display 112 of device 100 for beginning the pairing process between the wearable audio output devices 516 and the portable multifunction device 100. While displaying the user interface, device 100 periodically and repeatedly listens for wireless broadcast signals (e.g., pairing requests) from one or more peripherals (e.g., earbuds 516-1 and 516-2 as well as earbud case 516-3) to pair the peripheral(s) with device 100. In some embodiments, as illustrated throughout FIGS. 5B-5E, device 100 can detect pairing requests from peripherals when the peripheral is within threshold distance 518 of device 100 and cannot detect pairing requests from peripherals when the peripheral is outside of threshold distance 518. For example, at the bottom of FIG. 5B, FIG. 5B illustrates an example spatial relationship (e.g., physical distance) between device 100 and earbuds 5016-1 and 516-2 as well as earbud case 516-3, where earbuds 516-1 and 516-2 as well as earbud case 516-3 are outside of threshold distance 518 of device 100. In contrast, FIG. 5C illustrates an example in which earbud 516-1, earbud 516-2, and earbud case 516-3 (illustrated and hereinafter referred to collectively as earbud set 520) are within threshold distance 518 of device 100, where the device 100 is capable of detecting pairing requests from the peripherals.

Figure 5C:
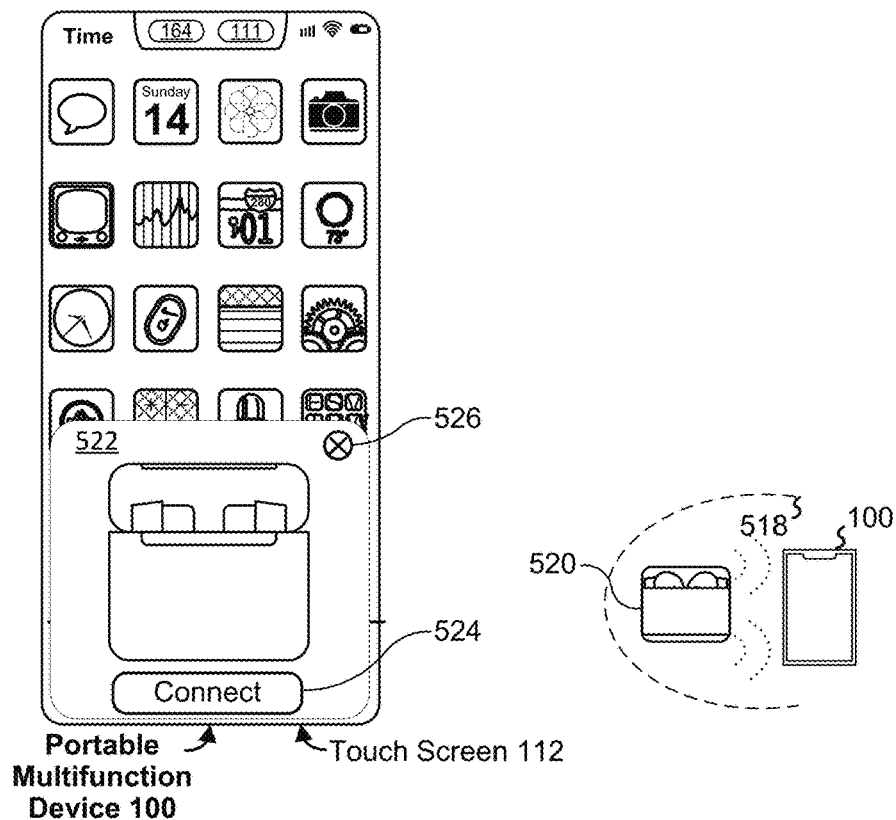

FIG. 5C illustrates an example user interface, displayed subsequent to the user interface in FIG. 5B, and in some embodiments only after a peripheral (e.g., earbud 516-1) or set of peripherals (e.g., earbud set 520) move from outside of threshold distance 518 to within threshold distance 518 of device 100. In FIG. 5C, device 100 detects a pairing request from a peripheral (e.g., earbud 516-1, which is shown in FIG. 5B and part of earbud set 520 in FIG. 5C) that is located within threshold distance 518 of device 100. In some embodiments, in response to detecting the pairing request from earbud 516-1, device 100 determines whether earbud 516-1 meets coupling criteria. In the example shown in FIG. 5C, coupling criteria is met when an earbud (e.g., earbud 516-1) is placed within and/or is electrically coupled to an earbud case (e.g., earbud case 516-3) (e.g., to form earbud set 520). After device 100 determines that earbud 516-1 meets coupling criteria (e.g., in response to device 100 determining that earbud 516-1 meets the coupling criteria), device 100 displays window 522 overlaid on the user interface (e.g., a home screen or application-launch user interface) of FIG. 5C. Window 522 includes a representation of earbud set 520 and button 524 (labeled "Connect"), which, when activated by a user input, initiates pairing of device 100 with the peripherals (e.g., earbuds 516-1 and 516-2 and earbud case 516-3 shown in FIG. 5B) of earbud set 520. In some embodiments, the user interface(s) shown in window 522 are instead displayed on the entirety (or substantially all, e.g., greater than 95%, 96%, 97%, 98%, or 99%) of touch screen 112. In some embodiments, device 100 also displays an exit button 526 that, when activated by a user input, such as a tap gesture, causes window 522 to cease to be displayed so that the user can perform other operations on device 100. Where exit button 526 accompanies another user interface described herein (e.g., a user interface that is related to announcing notifications), exit button 526, when activated by a user input, causes that user interface to cease to be displayed.

Figure 5D:
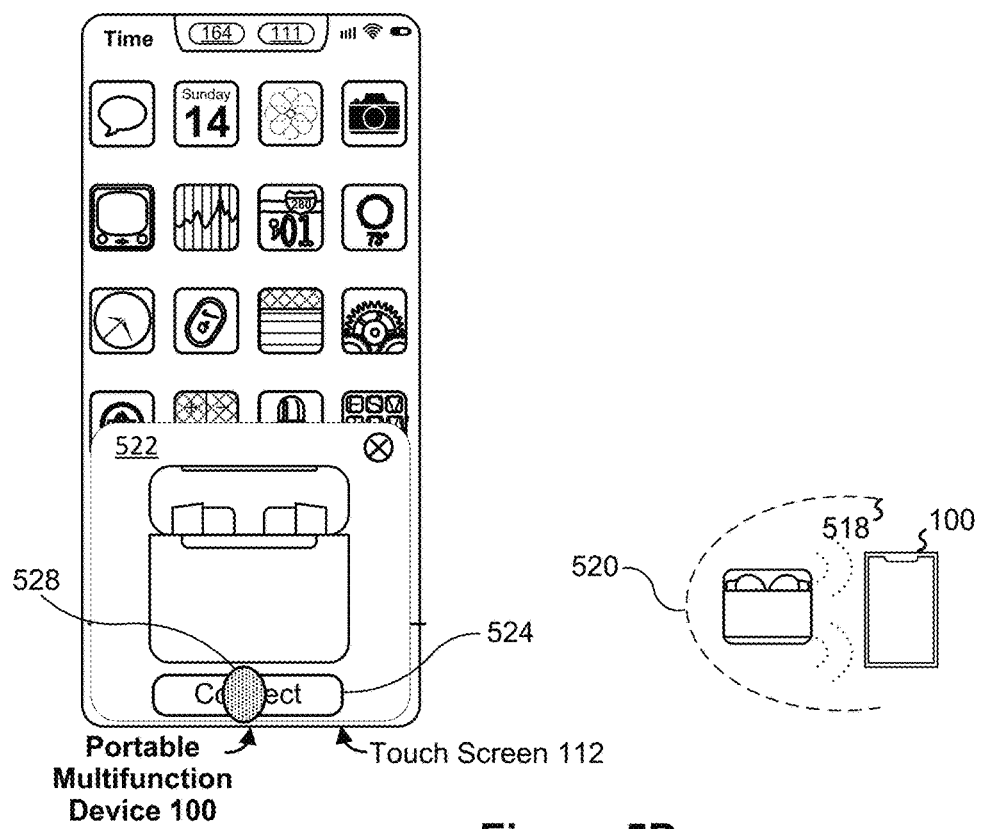
Figure 5E:
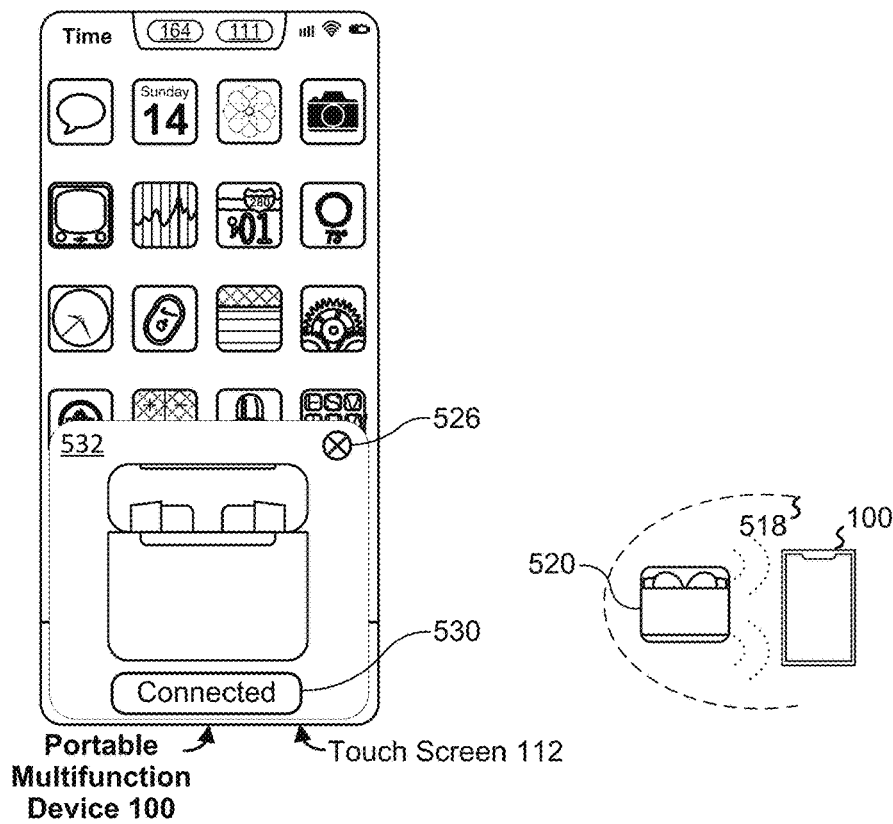

FIGS. 5D-5E illustrate transitions from FIG. 5C. In particular, FIG. 5D shows input 528 (e.g., a tap gesture) on button 524 in window 522. In response to detecting input 528, device 100 initiates pairing of device 100 with the peripherals of earbud set 520. In FIG. 5E, after device 100 has paired with the peripherals of earbud set 520, device 100 displays an indication 530 (labeled "Connected") in window 532 to indicate that device 100 is paired with (e.g., connected to) earbud set 503. In some embodiments, device 100 displays, in window 530, a button that, when activated, causes device 100 to proceed from the pairing process to a user interface for configuring audio notifications to be delivered via the earbuds 516-1 and 516-2 in a user's ears.

Figure 5F:
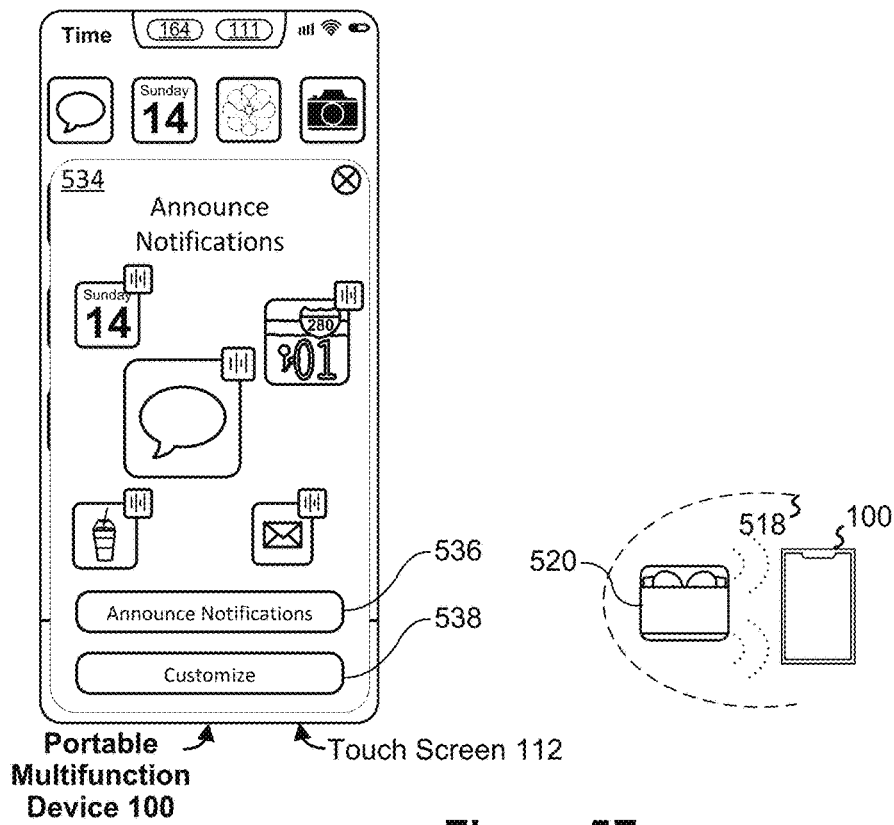

FIG. 5F illustrates that in response to initializing communication between earbud set 520 and portable multifunction device 100, window 534 is displayed in place of or overlaying window 532. In some embodiments, window 534 takes up all or substantially all of the display. In some embodiments, "substantially all" means the window 534 takes up all of the display except for portions of the display used to display the time and other system level functionalities (e.g., Wi-Fi status, cellular signal status, and/or battery status). Window 534 includes a button 536 labeled "Announce Notifications," and another button 538 labeled "Customize." If an input (e.g., a user input such as a touch or tap) at button 536 labeled "Announce Notifications" is received, then audio notifications for applications that differentiate high-priority notifications from lower-priority notifications are enabled by default. For example, if an application is configured to differentiate between high-priority notifications and lower-priority notifications, then the application will be permitted to deliver audio notifications (e.g., high-priority notifications) to the user of the electronic device via earbuds 516-1 and 516-2. In contrast, if an application is not configured to differentiate between high-priority notifications and lower-priority notifications, then notifications from that application will not be enabled to be delivered as audio notifications. In some instances, this default configuration may not be what the user desires, and thus button 538 labeled "Customize" is also available to enable the user to select which applications deliver audio notifications. When a user selects button 538 labeled "Customize," the user will be presented with a user interface for selecting, which applications can deliver audio notifications (see e.g., Figures I-J).

Figure 5G:
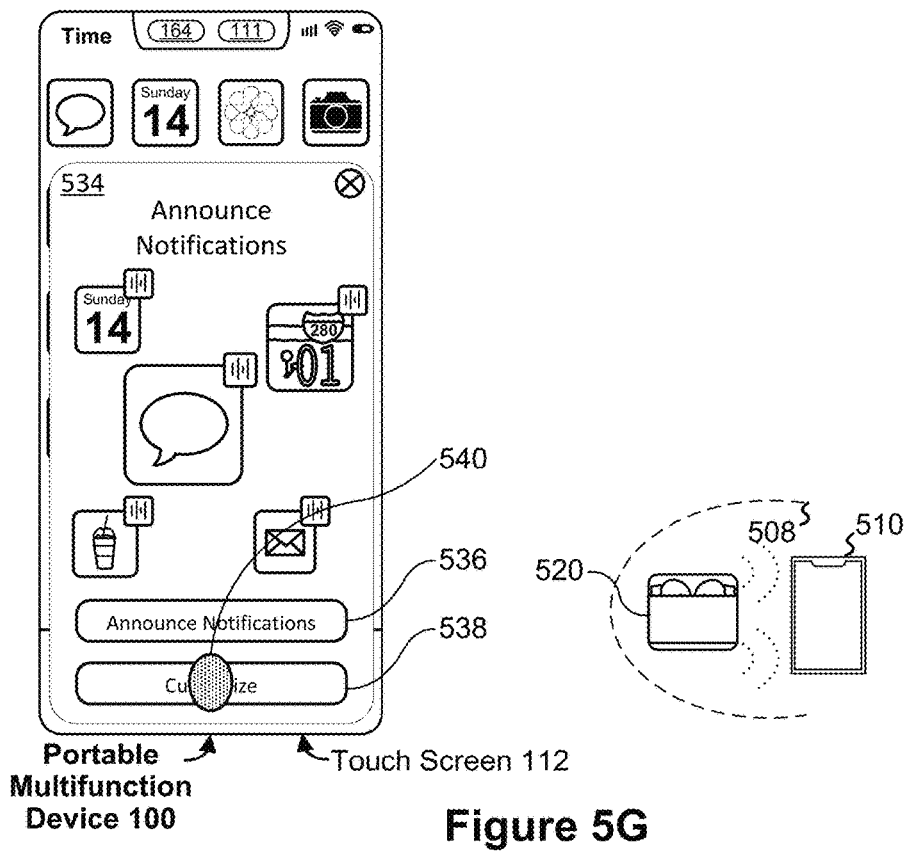
Figure 5H:
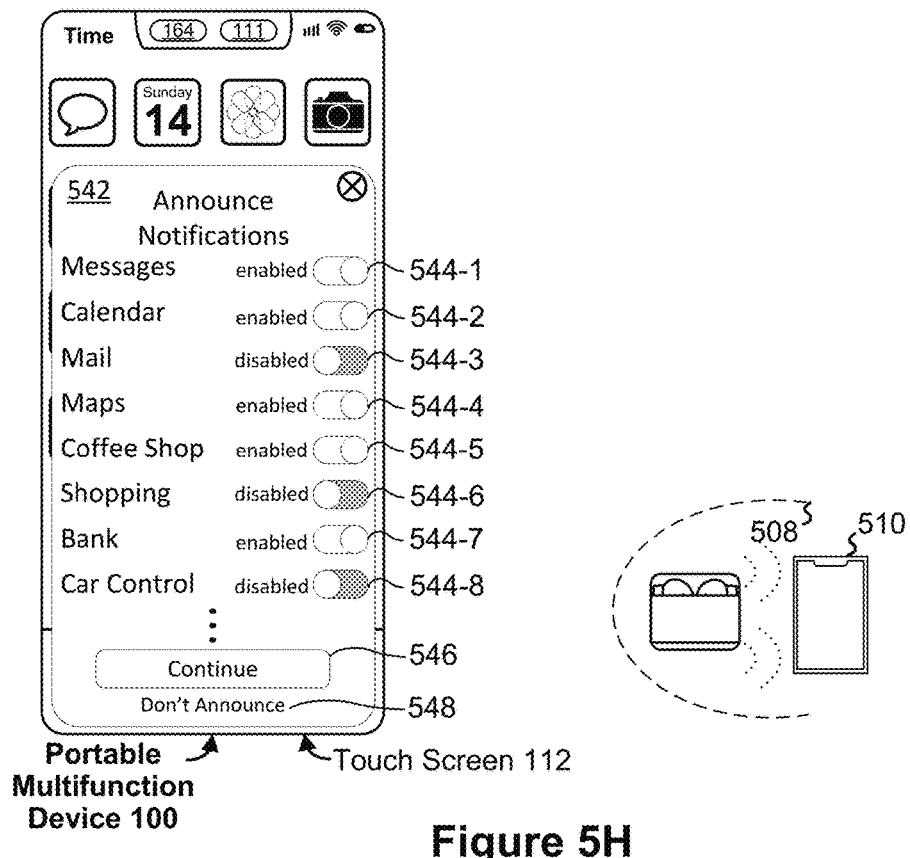

FIG. 5G illustrates an input 540 over button 538 labeled "Customize, and in response to input 540 the user interface 542 shown in FIG. 5H is displayed. In some embodiments, user interface 542 takes up all or substantially all of the display. In some embodiments, substantially all means the user interface 542 takes up all of the display except for portion of the display used to display the time and other system level functionalities (e.g., Wi-Fi status, cellular signal status, and/or battery status). User interface 542, shown in FIG. 5H, shows multiple selectable user interface elements (e.g., selectable user interface elements 544-1 through 544-8), which are for enabling or disabling audio notifications for individual applications installed on the portable multifunction device. In some embodiments, by default some of the applications (e.g., the "Car Control" application, and "Shopping" application) listed in user interface 542 are disabled as a result of the applications not being configured to differentiate between high-priority notifications and lower-priority notifications. In some embodiments, the initially displayed selectable user interface elements are part of a longer list of selectable user interface elements that is scrollable, and scrolling of that list enables display of additional selectable user interface elements (not currently displayed) that did not initially fit within the user interface 542. In some embodiments, user interface 542 includes a button 546 labeled "Continue," which when selected continues the initialization process between the earbuds 516-1 and 516-2 and the portable multifunction device 100.

Figure 5I:
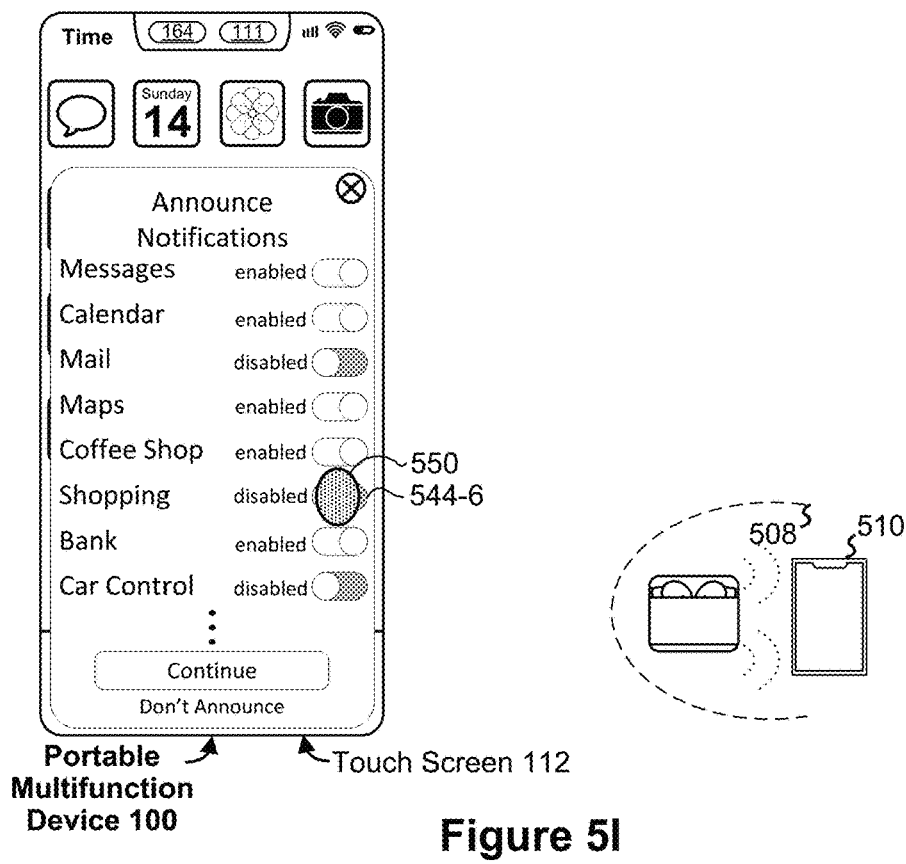
Figure 5J:
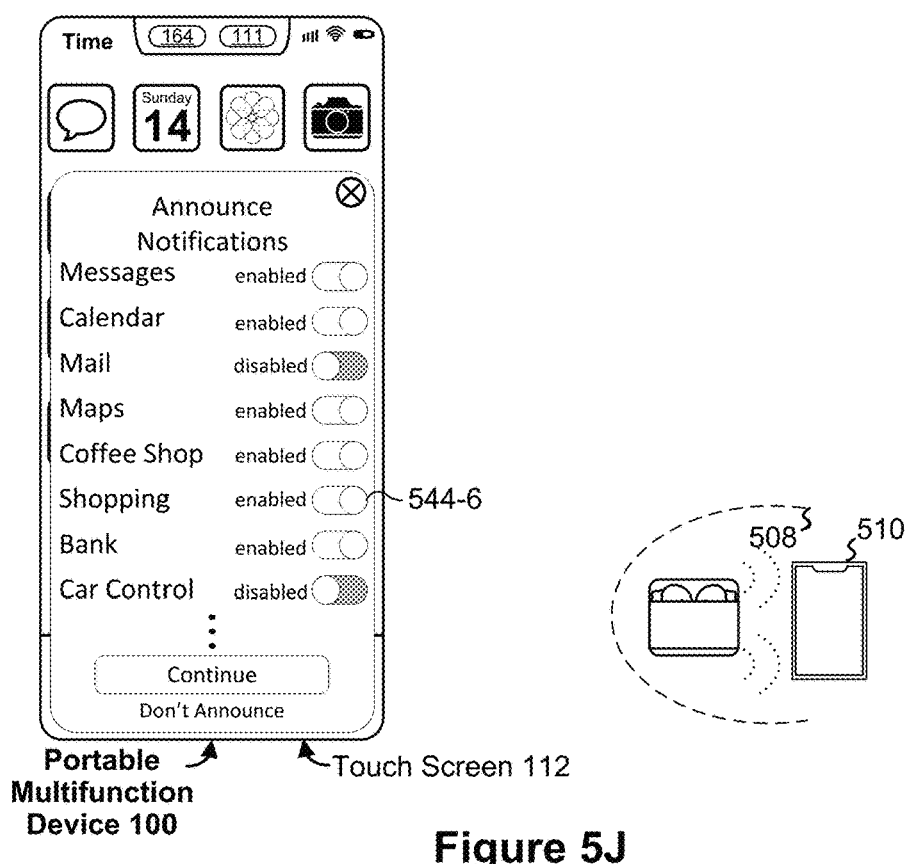

FIG. 5I shows an input 550 at a respective selectable user interface element, in this example selectable user interface element 544-6, which controls whether audio notifications are enabled or disabled for a respective application, in this example a "Shopping" application. FIG. 5J shows that in response to the input 550 at selectable user interface element 544-6 in FIG. 5I, the audio notifications for "Shopping" application are enabled. This is indicated by selectable user interface element 544-6 switching from the disabled state to the enabled state. In some embodiments, when audio notifications for a respective application are enabled the user, but audio notifications for the respective application were disabled by default because the application is not configured to differentiate high-priority notifications from lower-priority notifications, all notifications from the respective application will be delivered as audio notifications.

FIGS. 5K-1 through 5K-12 show different permutations of notifications that are delivered, or not, to a user of the portable multifunction device 100 (or other computer system) as audio notifications (e.g., delivered via earbuds 516-1, and 516-2), based on whether audio notifications are enabled (for a particular application) and whether notifications are prioritized (by the particular application). In these figures, settings 552 and 554 are application-specific settings for enabling or disabling delivery of audio notifications, and if enabled, for limiting or not limiting the delivery of audio notifications to high-priority notifications, respectively. Furthermore, in these figures, notifications shown in boxes 556 are notifications generated by or provided by a respective application, notifications 558 are displayed notifications (or indicate the lack of a displayed notification in some contexts), and notifications 560 are audio notifications (or indicate the lack of an audio notification in some contexts).

Figure 5L:
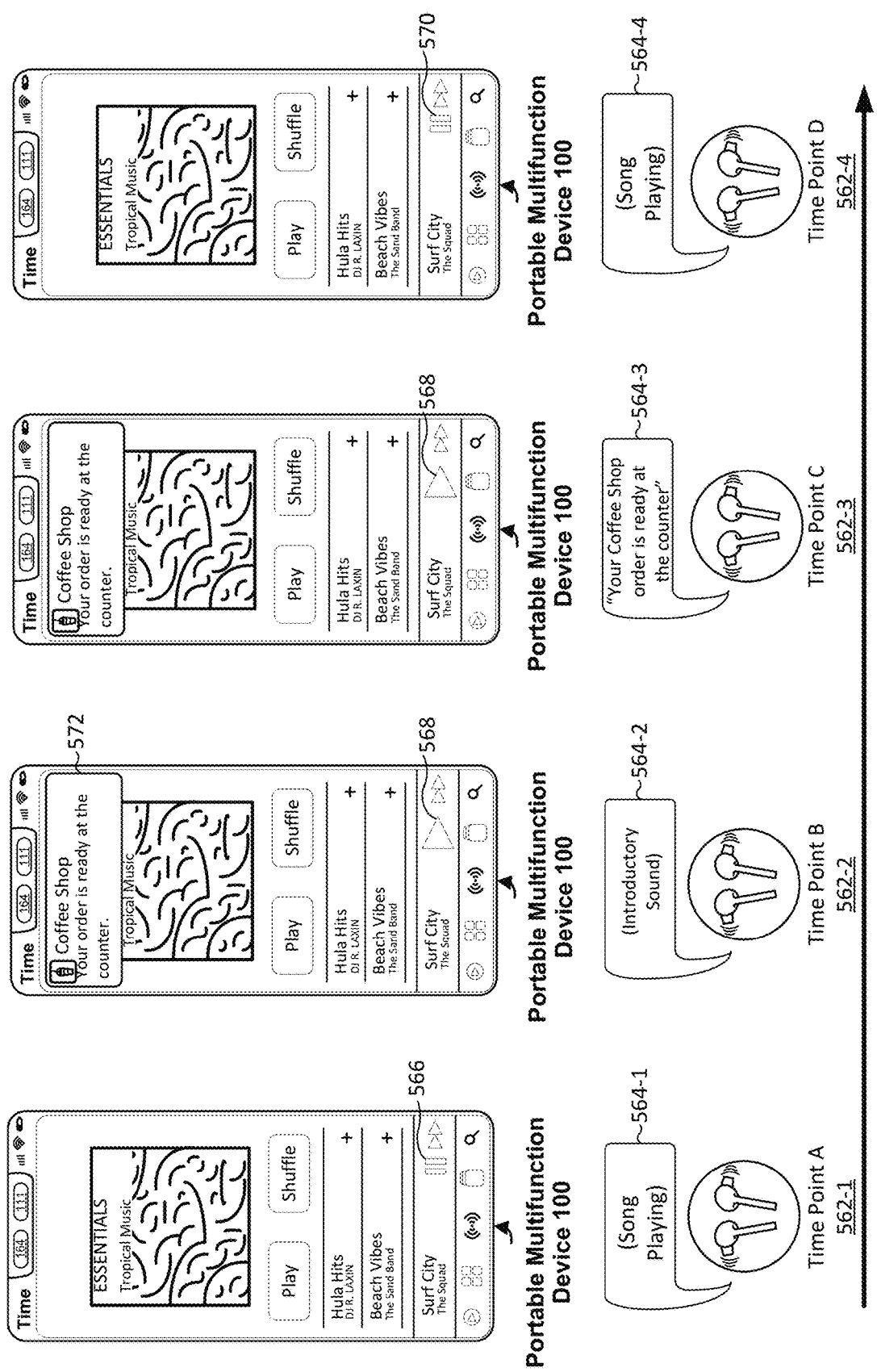
Figure 5N:
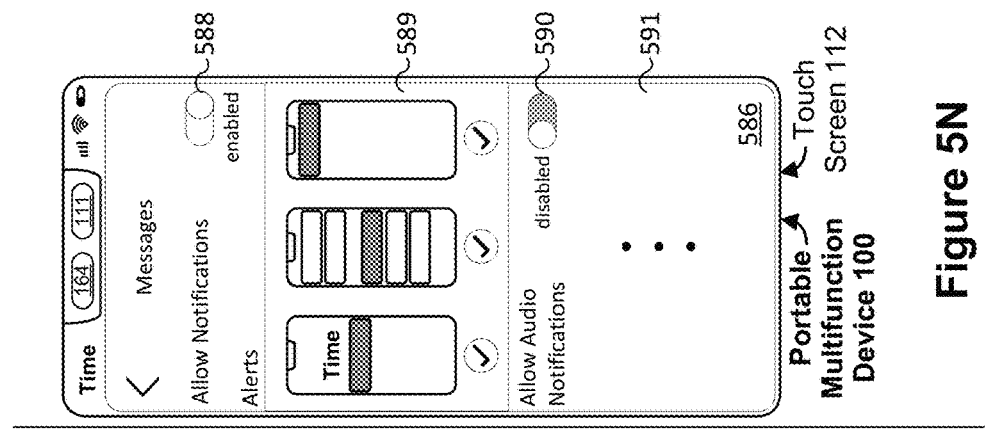
Figures 3, 5M:
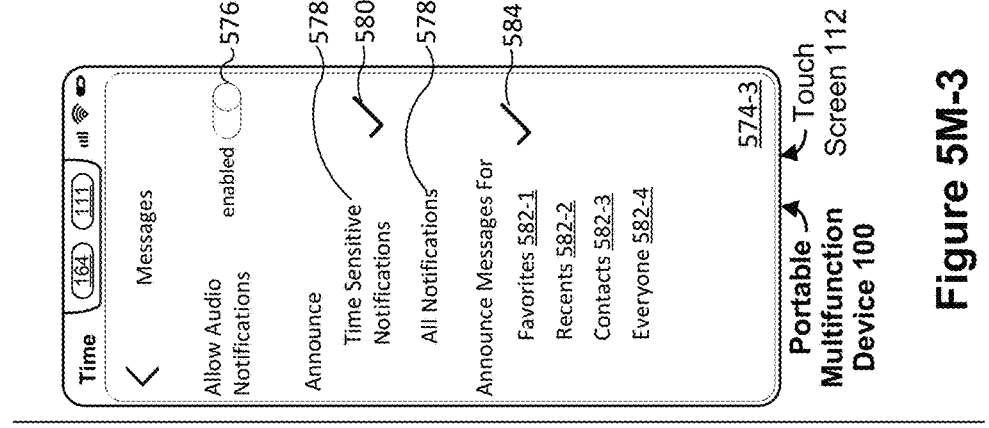
Figures 2, 5M:
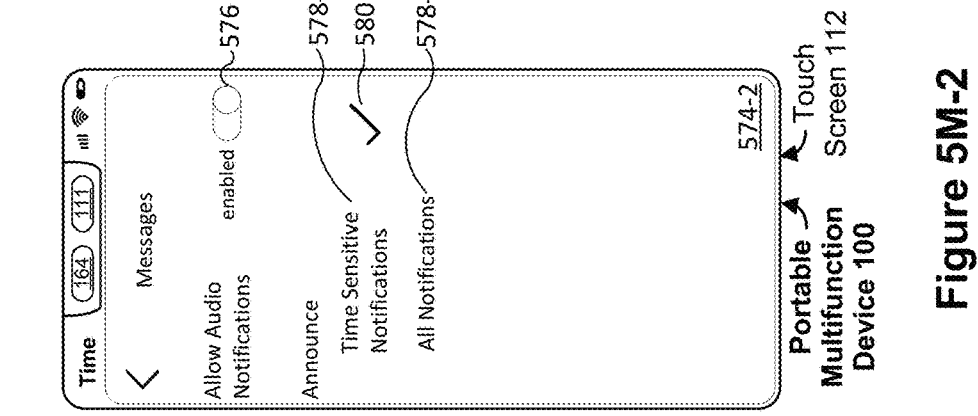
Figures 1, 5M:
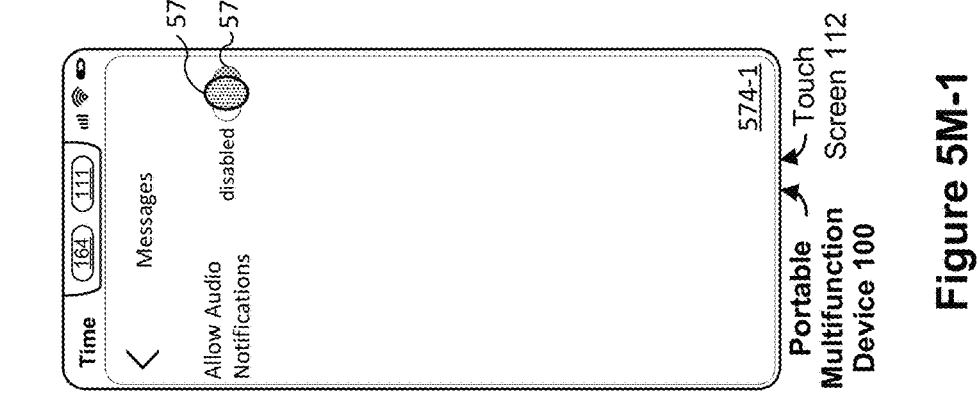

FIGS. 5K-1 and 5K-2 illustrate that notification deliveries by an application when audio notifications for the application are enabled, and the application is configured to differentiate between high-priority notifications and lower-priority notifications.

FIG. 5K-1 illustrates in box 556-1 that a high-priority coffee shop notification is delivered that recites "Order is ready at the counter." FIG. 5K-1 also illustrates a partial view of portable multifunction device 100 to illustrate textual/visual notifications (e.g., visual notification 558-1), and an audio notification dialogue box 560-1 to illustrate that an audio notification is delivered to the earbuds 516-1 and 516-2. Specifically, in FIG. 5K-1, since audio notifications are enabled, as indicated by application-specific setting 552-1, and only high-priority notifications are allowed to be delivered as audio notifications, as indicated by 554-1, then only audio notifications designated as high-priority notifications will be delivered to the earbuds 516-1 and 516-2 for output. This is indicated by dialogue box 560-1, which includes an audio notification that recites "Your Coffee Shop order is ready at the counter." In addition, a corresponding visual notification 558-1, is optionally also be displayed. Visual notification 558-1 includes a similar or the same notification as the audio notification 560-1.

FIG. 5K-2 shows another example, with the same application-specific settings 552-2 and 554-2 as settings 552-1 and 554-1 in FIG. 5K-1. FIG. 5K-2 differs from FIG. 5K-1 in that the notification indicated in box 556-2 is not classified by the Coffee Shop application as being a high-priority notification. As a result, only a visual/textual notification is displayed as shown by notification 558-2, which states that "You earned a $5 coupon on your next order." In other words, the coffee shop application is not designating promotional notifications as high-priority notifications. To illustrate that no audio notification is being played, a dialogue window is not shown and instead a caption 560-2 that recites "(no audio notification)" is shown in FIG. 5K-2.

Figure 4B:
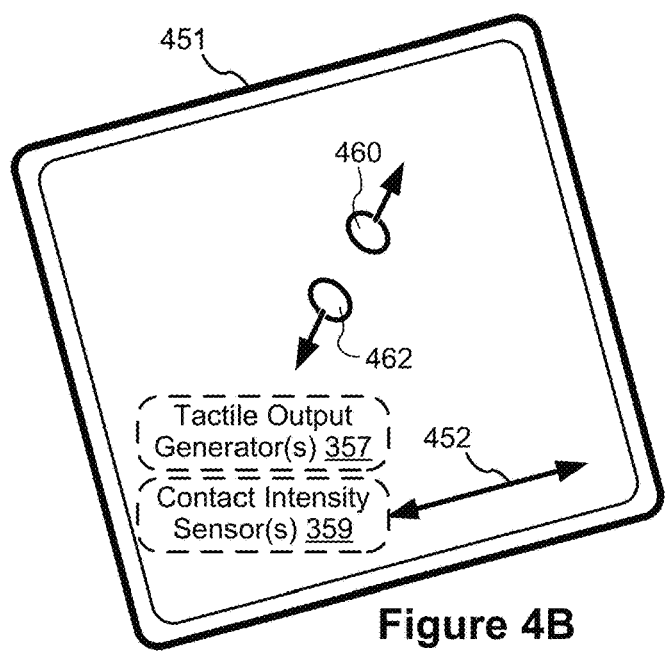

FIGS. 5K-3 and 5K-4 illustrate notification deliveries by an application when audio notifications for the application are disabled, as indicated by application-specific setting 552-3, 552-4, but the application is still configured to differentiate between high-priority notifications and lower-priority notifications.

FIG. 5K-3 shows an example of notification deliveries when audio notifications are disabled for a specific application. Audio notifications are indicated as being disabled, e.g., by application-specific setting 552-3. Since audio notifications are disabled for this application, differentiating between high-priority notifications and lower-priority notifications is not applicable for this application, as indicated by application-specific setting 554-3 (e.g., this setting is not applicable when application-specific setting 552-3 is set to "disabled"). As a result, in accordance with the application generating or providing a notification, as indicated by box 556-3, only a visual/textual notification is displayed, as shown by notification 558-3, which states that "Your order is ready at the counter." Despite this notification being designated as high-priority, the notification is not delivered as an audio notification. In other words, despite the coffee shop application designating order notifications as being high-priority, no audio notification is delivered, e.g., as a result of a user disabling all audio notifications for the specific application (e.g., the Coffee Shop application). To illustrate that no audio notification is being delivered, a dialogue window is not shown and instead a caption 560-3 that recites "(no audio notification)" is shown.

FIG. 5K-4, which is similar to FIG. 5K-3, show an example a lower-priority notification delivery when audio notifications for the application are disabled, e.g., by application-specific setting 552-4; as shown, lower-priority notifications are not delivered as audio notifications, because audio notifications for the application are disabled. As a result, in accordance with the application generating or providing a notification, as indicated by box 556-4, only a visual/textual notification is displayed, as shown by notification 558-4, which states that "You earned a $5 coupon on your next order." And, to illustrate that no audio notification is being played, a dialogue window is not shown and instead a caption 560-4 that recites "(no audio notification)" is shown. As shown in FIG. 5K-4, and similar to FIG. 5K-3, application-specific setting 554-4 is not applicable when application-specific setting 552-4 is set to "disabled".

In contrast to FIGS. 5K-1 through 5K-4, FIGS. 5K-5 and 5K-6 illustrate delivery of audio notifications and textual/visual notifications when audio notifications are enabled, as indicated by application-specific setting 552-5 or 552-6, and audio notifications are delivered for every notification provided by the application (e.g., "Coffee Shop" application). In this example, even though the application is configured to differentiate between high-priority notifications and lower-priority notifications, a user has chosen to override the default setting, which would be to deliver only high-priority notifications as audio notifications, and has instead chosen to have all notifications for this application delivered as audio notifications, as indicated by application-specific setting 554-5 or 554-6 ("high-priority notifications only") being set to "No." To demonstrate this, FIG. 5K-5 shows that a high-priority notification (e.g., the notification identified in box 556-5) is delivered as an audio notification (e.g., the audio notification shown in dialogue window 560-5) and also a displayed notification 558-5, and FIG. 5K-6 shows that lower-priority notification (e.g., the notification identified in box 556-6) is also delivered as an audio notification (e.g., the audio notification shown in dialogue window 560-6) and also a displayed notification 558-6.

FIGS. 5K-7 and 5K-8 illustrate delivery of audio notifications and textual/visual notifications when audio notifications are enabled for an application (e.g., a "Shopping Store" application), as indicated by application-specific setting 552-7 or 552-8, and the application does not differentiate high-priority notifications from lower-priority notifications, as indicated by application-specific setting 554-7 or 554-8. To demonstrate this FIG. 5K-7 shows that a notification (e.g., the notification identified in box 556-7) is delivered as an audio notification (e.g., the audio notification shown in dialogue window 560-7) and also a displayed notification 558-7, and FIG. 5K-8 shows that another notification (e.g., the notification identified in box 556-8) is delivered as an audio notification (e.g., the audio notification shown in dialogue window 560-8) and also a displayed notification 558-8.

FIGS. 5K-9 and 5K-10 illustrate delivery of textual/visual notifications when audio notifications are disabled, as indicated by application-specific setting 552-8 or 552-10 being set to "Disabled," and the application is not configured to differentiate between high-priority notifications and lower-priority notifications, as indicated by the value of application-specific setting 554-8 or 554-10 being designated in these figures as N/A (e.g., "not applicable").

FIG. 5K-9 illustrates delivery of a notification when audio notifications are disabled. Audio notifications are indicated as being disabled by application-specific setting 552-9. Since audio notifications are disabled, then differentiating between high-priority notifications and lower-priority notifications is not applicable, as indicated by application-specific setting 554-9. As a result, in accordance with the application generating or providing a notification, as indicated by box 556-9, only a visual/textual notification is displayed, as shown by notification 558-9, which in this example states that "You received thirty-six new emails." To illustrate that no audio notification is being delivered, a dialogue window is not shown and instead a caption 560-9 that recites "(no audio notification)" is shown. FIG. 5K-10 is a variation of FIG. 5K-9 where the notification would have (or might have) been classified as a high-priority notification if the application differentiated notifications, but is, again, not delivered as an audio notification. Since audio notifications are disabled, differentiating between high-priority and lower-priority notifications is not applicable, as indicated by application-specific setting 554-10 (e.g., "N/A"). Thus, in accordance with the application generating or providing a notification, as indicated by box 556-10, no audio notification is delivered, as indicated by caption 560-10 that recites "(no audio notification)," and only a visual/textual notification is displayed, as shown by notification 558-10.

FIG. 5K-11 and 5K-12 illustrate another example of delivery of notifications when audio notifications are enabled, as indicated by application-specific settings 552-11 and 552-12, and the application (e.g., a Maps application or navigation application) (e.g., an application executed by device 100 or 300, or by a computer system, having a display, such as display 112 or 340) is configured to differentiate between high-priority notifications and lower-priority notifications, as indicated by application-specific settings 554-11 and 554-12. In particular, FIG. 5K-11 illustrates delivery of audio notifications (e.g., as indicated by dialogue window 560-11) while the electronic device's display is in an off-state (e.g., as indicated by 558-11). In some embodiments, audio notifications may be delivered without a corresponding visual/textual notification, even when the display is an on-state. FIG. 5K-12 shows another example of notification delivery when the display of the device or computer system is in an on-state and a visual/textual notification (e.g., as illustrated by 558-12) is displayed during, before or after a corresponding audio notification is delivered (e.g., as indicated by dialogue window 560-12).

FIG. 5L illustrates an example of how an audio notification is delivered when the wearable audio output devices, e.g., earbuds 516-1, and 516-2, are outputting ongoing audio from another audio source (e.g., a music application, a podcast application, a movie application, etc.). At a first time, as indicated by "Time point A" 562-1 the portable multifunction device 100 shows ongoing audio playing (e.g., pause button 566 illustrates ongoing audio from a music application). Dialogue window 564-1 illustrates that at "Time point A" 562-1 a song is being output via earbuds 516-1, and 516-2. At a second time, later than the first time, as indicated by "Time Point B" 562-2, a notification is provided to (or by) the electronic device and is designated as being a high-priority notification by the issuing application (e.g., the coffee shop application). In response to the notification being provided to (or by) the electronic device, the ongoing audio is paused, as indicated by play button 568 now being displayed. After the ongoing audio is paused, an introductory sound (e.g., a tone, or other voice communication indicating a notification is to be played) is played as shown by dialogue window 564-2. In some embodiments, a corresponding visual/textual notification (e.g., notification 572) may be concurrently displayed around the time the introductory sound is played. At a third time, as indicated by "Time Point C" 562-3, the introductory sound ceases to be output and the audio notification is played, as indicated by dialogue window 564-3, which recites "Your Coffee Shop order is ready at the counter." While the audio notification is being output, the previously output ongoing audio (e.g., the song) remains paused, as indicated by play button 568 being maintained. In some embodiments, the visual/textual notification 572 remains displayed as long as the audio notification is being delivered. In some embodiments, the visual/textual notification may be persistent until manually dismissed or automatically dismissed after a predetermined amount of time (e.g., 5 seconds, 10 seconds, 15 seconds, etc.,). At a fourth time, as indicated by "Time Point D" 562-4, the audio notification finishes outputting and the previously ongoing audio is resumed, as indicated by pause button 570 and dialogue window 564-4 which indicates the song is playing. In some embodiments, no introductory sound is played prior to delivery of the audio notification. Furthermore, in some embodiments or in some circumstances, the ongoing audio is not paused during delivery of the audio notification, and instead the volume of the ongoing audio is substantially reduced (e.g., by 50 percent or more, or 80 percent or more) while the audio notification is delivered, and after delivery of the audio notification is completed, the volume of the ongoing audio is restored to its prior volume.

In some embodiments, for each application that produces or provides notifications, or for each of a plurality of applications, the computer system provides one or more settings user interface to enable the user to receives specify whether the application is enabled (or configured) to output audio notifications, and, if so, what notifications from the application are to be delivered as audio notifications. FIGS. 5M-1 through 5M-3 indicate three example settings user interfaces for enabling a user to specify whether a particular application is configured to output audio notifications, and, if so, what notifications are to be delivered as audio notifications. In particular, FIG. 5M-1 illustrates a settings user interface 574-1 with selectable user interface element 576 for enabling and disabling audio notifications for an application (e.g., for one specific application, such that audio notifications of other applications are not affected by the setting made using selectable user interface element 576). In response to receiving an input 577 on selectable user interface element 576, the user interface of either FIG. 5M-2 or 5M-3 is displayed. FIG. 5M-2 illustrates a settings user interface 574-2 for an application in which audio notifications have been enabled, as shown by selectable user interface element 576 being in the enabled state. In this example, when audio notifications are enabled, additional selectable user interface elements 578-1 and 578-2 are displayed in settings user interface 574-2; these user interface elements 578-1 and 578-2 allow the user to select between delivering as audio notifications only notifications that are time sensitive, or all notifications, respectively. In this example, a check mark 580 is displayed next to selectable user interface element 578-1 indicating that the application is configured (e.g., by default, or in response to a user input) to announce audio notifications for (e.g., only for) time sensitive notifications. FIG. 5M-3 illustrates an alternative settings user interface that includes additional selectable user interface elements for adjusting what notifications are announced as audio notifications. For example, in a messaging application, it may be desirable for the user to specify that they receive as audio notifications high-priority notifications from (e.g., only from) certain individuals. Thus, the example of a settings user interface 574-3 illustrated in FIG. 5M-3 includes four additional selectable user interface elements that further limit what notifications are delivered as audio notifications. In particular the four selectable user interface elements are: a selectable user interface 582-1 element for allowing audio notifications only for high-priority notifications from or associated with favorited contacts/entities (e.g., only from contacts or entities listed in a favorites list of the user); a selectable user interface element 582-2 for allowing audio notifications only for high-priority notifications from or associated with entities associated with recent communications; a selectable user interface 582-3 for allowing audio notifications only for high-priority notifications from or associated with contacts associated with a user of a portable multifunction device (e.g., contacts listed in a contacts list associated with the user); and a selectable user interface 582-4 for allowing audio notifications for high-priority notifications from (or associated) with all entities (e.g., everyone). In this example, the settings user interface 574-3 shown in FIG. 5M-3 also includes a check mark 584 next to selectable user interface elements 582-1, indicating that the application is (e.g., has been) configured (e.g., in response to a user input) to announce as audio notifications only high-priority notifications from (or associated with) favorited contacts/entities.

FIG. 5N illustrates a user interface 586 which is an alternative or complimentary user interface to the user interfaces shown in FIGS. 5M-1 through 5M-3 for enabling or disabling audio notifications for an application. FIG. 5N includes a selectable user interface element 588 for enabling or disabling all notifications for an application, and optionally includes one or more user interface elements 589 for enabling or disabling the provision of such notifications in use contexts such as a lock screen, a notification center, and banners superimposed over application user interfaces. FIG. 5N also includes a separate selectable user interface element 590 for separately enabling or disabling audio notifications. Optionally, user interface 586 further includes additional user interface elements 591, such as those shown in FIG. 5M-2 or 5M-3 for further specifying which notifications are to be delivered as audio notifications.

FIGS. 6A-6E are flow diagrams illustrating method 600 of enabling multi-application audio notifications, via a computer system, such as an electronic device (e.g., a smartphone, tablet, smart TV set-top box, augmented reality device, virtual reality device, or personal computer), and delivery of audio notifications, via wearable audio output devices (e.g., headphones), in accordance with some embodiments. Method 600 is performed (602) at (e.g., by) an electronic device (e.g., portable multifunction device 100 in FIG. 1A, or device 300 in FIG. 3A) that is in communication with a display generation component (e.g., touch-sensitive display system 112 in FIG. 1A or display 340 in FIG. 3A) and one or more wearable audio output devices. In some embodiments, instead of a wearable audio output device, the electronic device includes or is in communication with a stationary smart speaker, or a traditional speaker system. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to enable multi-application audio notifications, via an electronic device, and delivery of audio notifications, via wearable audio output devices (e.g., headphones, in-ear earphones, earbuds, etc.). Audio notifications, output via one or more (e.g., wearable) audio output devices, have the potential to be more intrusive than visual notifications, and as a result there is a need for a way to control which applications installed on an electronic device are configured, by default, to provide audio notifications. One approach for controlling which audio notifications are conveyed to a user is by requesting that applications distinguish between high-priority audio notifications (e.g., time-sensitive notifications, an example being a notification indicating that your order is ready for pickup from a dining application) and other (e.g., lower-priority) notifications (e.g., a notification indicating that you will receive a $5 coupon on a future order), and only delivering as audio notifications, by default, high-priority notifications. By making the determination to only enable audio notifications from applications that distinguish high-priority notifications from lower-priority notifications, a user will not be inundated with audio notifications.

In some embodiments, in order to enable such a feature, a user interface that includes a user interface element for enabling audio notifications for only applications that distinguish high-priority notifications from other notifications is provided. Having a single user interface element for enabling audio notifications for the specified subset of applications installed on the electronic device provides a better set up experience as the user does not have to manually select each application, they want to have audio notifications delivered from. Additionally, the user does not need to manually determine whether an application distinguishes between high-priority notifications and lower-priority notifications. In other words, if audio notifications were enabled for all applications without regard to whether the applications can be configured to announce only high-priority notifications, a user would be inundated with audio notifications. This would then require the user to have to either manually turn-off audio notifications for specific applications, one-by-one, or to disable audio notifications altogether. Thus, providing a single user interface element that allows a user to enable audio notifications only for applications that distinguish between high-priority notifications and other notifications greatly reduces the instances where a user will receive an undesirable amount of audio notifications, and also greatly reduces the burden on the user to specify which notifications are to be delivered as audio notifications. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device displays (604), via the display generation component, a user interface that includes a user interface element for enabling delivery of audio notifications (e.g., window 534 includes button 536 for enabling delivery of audio notifications in FIG. 5F), via the one or more wearable audio output devices (e.g., wearable audio output devices earbuds 516-1 and 516-2, shown in FIG. 5B). The audio notifications for which delivery is enabled, e.g., by user selection of the user interface element, are associated with a plurality of applications on the electronic device. Audio notifications are typically spoken or audible notifications by which applications provide information to a user of the electronic device with respect to events, such as receipt of a message, satisfaction of a specific condition, etc. From another perspective, audio notifications are notifications provided by an application or device that are audibly delivered, typically as spoken notifications. For example, a coffee shop application may transmit a spoken notification to a user that their drink is ready for pick-up.

The electronic device detects (606) a first input (e.g., a touch input) directed to the user interface element (e.g., touch input 540 in FIG. 5G directed to button 538, or alternatively button 536). In response to detecting (608) the first input directed to the user interface element (e.g., a UI element is displayed on the touch-sensitive display), and in accordance with a determination that a first application of multiple applications differentiates high-priority notifications from lower-priority notifications, the electronic device enables (610) delivery of audio notifications associated with the first application (e.g., as shown in FIG. 5H, the application is shown as being enabled to deliver audio notifications by selectable user interface element 544-1). In some embodiments, differentiating high-priority notifications from lower-priority notifications is done on an application-by-application basis (e.g., a coffee shop application may consider a high-priority notification as having an order ready, whereas a banking application may consider a notification regarding an unauthorized purchase as being a high-priority notification). In some embodiments, some of the applications on (e.g., installed on, or used by) the electronic device differentiate high-priority notifications from lower-priority notifications, while other applications on the electronic device do not differentiate high-priority notifications from lower-priority notifications.

In response to detecting (608) the first input directed to the user interface element (e.g., a UI element is displayed on the touch-sensitive display), and in accordance with a determination that the first application does not differentiate high-priority notifications from lower-priority notifications (e.g., the developer of the application has not specified which notifications from the application are considered to be high-priority or lower-priority), the electronic device forgoes (612) enabling delivery of audio notifications associated with the first application. In some embodiments, delivery of visual notifications by the first application is enabled despite the first application not differentiating high-priority notifications from lower-priority notifications.

In response to detecting (608) the first input directed to the user interface element (e.g., a UI element is displayed on the touch-sensitive display), and in accordance with a determination that a second application of the multiple applications differentiates high-priority notifications from lower-priority notifications, the electronic device enables (614) delivery of audio notifications from the second application.

In response to detecting (608) the first input directed to the user interface element (e.g., a UI element is displayed on the touch-sensitive display), and in accordance with a determination that the second application does not differentiate high-priority notifications from lower-priority notifications, the electronic device forgoes (616) enabling delivery of audio notifications from the second application (e.g., as shown in FIG. 5H, the application is shown as being disabled to deliver audio notifications by selectable user interface element 544-6).

In some embodiments, in response to detecting the first input directed to the user interface element, the electronic device determines (618) for each respect application of the multiple applications whether or not the respective application is permitted to deliver audio notifications.

Automatically, determining for each application of multiple applications whether or not the application is permitted to deliver audio notifications reduces the amount of manual customization required by the user of the device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first input (e.g., touch input) directed to the user interface element, in accordance with a determination that a third application of the multiple applications does not differentiate high-priority notifications from lower-priority notifications, the electronic device forgoes (620) enabling delivery of audio notifications by the third application (e.g., as shown in FIG. 5H, the "Car Control" application is shown as being disabled to deliver audio notifications by selectable user interface element 544-8).

Automatically forgoing enabling delivery of audio notifications from an application that does not differentiate high-priority notifications from lower-priority notifications helps to prevent a user of the electronic device from being inundated with undesirable notifications (e.g., advertisements, or other non-essential communication). This further enhances the user experience by not requiring the user manually turn off audio notifications for applications that don't differentiate between high-priority notifications and low-priority notifications. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, high-priority notifications include notifications that are identified by the application as being time sensitive notifications (622). For example, a time sensitive notification can be a notification where the relevancy of the notification will be significantly diminished if not promptly made known to a user of the electronic device. FIG. 5A, for example, shows that for a Coffee Application (502) an "Order Update Notification" 508 is identified by the application as a high-priority notification, and as such is delivered as an audio notification (e.g., as shown by as an audio notification 512).

Categorizing time-sensitive notifications (e.g., a notification pertaining to when your food or beverage order is ready) as high-priority notifications provides important information in a manner most likely to be processed by a user in the shortest amount of time. For example, an audio notification is less likely to be missed than a notification presented on the display generation portion of the electronic device, especially when the electronic device is not in view of the user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, high-priority notifications are notifications identified by an application as having high priority (624). In some embodiments, the application designates whether a notification has high priority (e.g., in a coffee store application, a pickup time can be considered a high-priority notification, or in a messaging application a notification of a received message from a favorited contact can be considered a high-priority notification). For example, FIG. 5A illustrates that Order Update Notification 508 is designated as have high priority. In some embodiments, a user of the device can configure which notifications within an application are considered as having high priority—e.g., in an email or messaging application, notifications of received messages can be designated as high priority based on the sender and/or keywords in the subject line; e.g., in a financial application, notifications regarding transactions can be designated as high priority based on an amount of the transaction exceeding a user-set threshold.

Allowing each application to designate which notifications are designated as high-priority notifications provides a better experience to the user as a certain type of notification in one application may not be considered a high-priority notification, but in another application the same type of notification may be considered a high-priority notification. For example, a delivery application delivering fresh food may designate deliveries as being high priority, whereas a freight company may not designate a delivery as being high priority. Thus, allowing the applications to specify what is high priority allows for a more tailored user experience. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after the electronic device determines (626) that the first application does not differentiate high-priority notifications from lower-priority notifications, and forgoing enabling delivery of audio notifications by the first application: the electronic device detects a second input (e.g., received at a touch-sensitive display or a track pad) directed to another user interface element associated with the first application (e.g., FIG. 5I illustrates input 550 being received at selectable user interface element 544-6 for enabling audio notifications for an application, e.g., the Shopping application, that is not configured to prioritize notifications), and in response to detecting the second input, the electronic device enables delivery of audio notifications for the first application (e.g., as shown in FIG. 5J, the Shopping application is shown as being enabled to deliver audio notifications by selectable user interface element 544-6, which in-turn means that audio notifications are enabled for the first application despite the first application's audio notifications being disabled by default).

Allowing a user to quickly activate audio notifications for applications that do not differentiate high-priority notifications from lower-priority notifications gives a user the ability tailor the audio notifications to their specific preferences without having to navigate to each application's specific setting menu. For example, a user may be keen on hearing all updates from a sporting application regardless of whether the application prioritizes high-priority notifications from lower-priority notifications. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface that includes the user interface element for enabling delivery of the audio notifications is a settings user interface for the electronic device (628) (e.g., FIGS. 5M-1 through 5M-3 and FIG. 5N all illustrate settings user interfaces for enabling delivery of notifications).

Having an easy to access settings user interface where a user can conveniently enable or disable audio notifications allows the user to quickly change whether or not they will receive audio notifications. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface that includes the user interface element for enabling delivery of the audio notifications is displayed while setting up the one or more wearable audio output devices for use with the electronic device (630). For example, the aforementioned user interface element is displayed in response pairing the electronic device to the one or more wearable audio output devices for the first time, and/or in response to completing a software upgrade. FIGS. 5B-5F, for example, show that in response to pairing the wearable audio output devices (e.g., earbud set 520) with the portable multifunction device 100, the device displays a user interface (e.g., window 534) that includes a user interface element for enabling delivery of audio notifications (e.g., button 536 and button 538).

Automatically providing the user with a user interface to enable or disable delivery of the audio notifications when initializing communication between the one or more wearable audio output devices and the electronic device allows the user to better and more efficiently set up their wearable audio output device. For example, if this option was not given to the user during set up, they might not appreciate this feature at all. Moreover, even if they did understand that this feature was available, they would have to separately go into a settings menu and set it up. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a settings user interface (632) (e.g., settings user interfaces 574-1, 574-2, 574-3, and 574-4 in FIGS. 5M-1 through 5M-3 and 5N), and method 600 includes the electronic device detecting (632) a second input directed to another user interface element (e.g., selectable user interface element 576, in settings user interface 574-1) associated with the first application (e.g., input 577 in FIG. 5M-1), and in response to detecting the second input, displaying a notification control user interface associated with the first application, wherein displaying the notification control user interface includes concurrently displaying: a first user interface element for enabling delivery of a subset of notifications associated with the respective application as audio notifications (e.g., the settings user interfaces illustrated in FIGS. 5M-2 and 5M-3 include selectable user interface elements 578-1 for enabling audio notifications for time sensitive notifications, and the settings user interface in FIG. 5M-3 also includes selectable user interface elements 582-1 through 584-4 for further controlling the subset of notifications delivered as audio notifications), and a second user interface element for enabling delivery of a larger set of notifications associated with the respective application (e.g., all notifications or a second subset of notifications that is larger than the subset of notifications). For example, the settings user interfaces illustrated in FIGS. 5M-2 and 5M-3 include selectable user interface elements 578-2 for enabling audio notifications for all notifications. In some embodiments, the settings user interface includes a third interface element for disabling delivery of all notifications associated with the respective application as audio notifications.

Allowing a user to select a subset of notifications that are to be delivered as audio notifications, by providing in a settings user interface a set of user selectable user interface elements that each correspond to a particular subset of notifications, gives a user the ability tailor the audio notifications to their specific preferences. For example, a user may want to specify which notifications they want delivered as audio notifications and which notifications they don't want delivered as audio notifications. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, before displaying a user interface that includes a user interface element for enabling delivery of audio notifications via the one or more wearable audio output devices, the electronic device displays (634) another user interface that includes a first user interface element for enabling a default set of applications to deliver audio notifications (e.g., for notifications that are designated by those applications to be high-priority notification), and a second user interface element for selecting (and/or customizing) which applications are enabled to deliver audio notifications. For example, FIG. 5F illustrates a user interface with two separate user interface elements (e.g., button 536 and button 538) for either enabling the default set of applications to deliver audio notifications, or for enabling the user to choose which applications to enable to deliver audio notifications. In some embodiments, in accordance with a determination that the first user interface element for enabling the default set of application is selected, method 600 includes enabling delivery of audio notifications for each application that differentiates high-priority notifications from lower-priority notifications, and forgoing displaying the user interface that includes a user interface element for enabling delivery of audio notifications; and in accordance with a determination that the second user interface element is selected, displaying a user interface that includes respective user interface elements for enabling delivery of audio notifications for a plurality of different applications.

Allowing a user to select which subset of notifications are delivered as audio notifications gives a user the ability tailor the audio notifications to their specific preferences. For example, a user may want to specify which notifications they want delivered as audio notifications and which notifications they don't want delivered as audio notifications, or alternatively, they may just want to let the electronic device decide for them. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects (636) an input at the second user interface element for selecting which applications are enabled to deliver audio notifications. In some embodiments, in response to detecting the input at the second user interface element (e.g., input 540 at button 538 in FIG. 5G), the electronic device displays a user interface that includes respective user interface elements (e.g., a user selectable user interface elements 544-1 through 544-8 as shown in FIG. 5H) for enabling delivery of audio notifications for a plurality of different applications.

Allowing a user to select which subset of notifications are delivered as audio notifications gives a user the ability tailor the audio notifications to their specific preferences. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects (638) an input at the first user interface element for enabling the default set of applications to deliver audio notifications. In some embodiments, in response to detecting the input at the first user interface element, the electronic device enables delivery of audio notifications for applications designated as default applications (e.g., as shown in FIG. 5H at least some of the applications are enabled by default as indicated by the different states of selectable user interface elements 544-1 through 544-8). In some embodiments, the default applications are applications that differentiate high-priority notifications from lower-priority notifications.

Enabling audio notifications, by default, from applications that differentiate high-priority notifications from lower-priority notifications ensures that users are provided with the best default experience without having to tailor the delivery of audio notifications to their preferences. For example, it would be highly inconvenient if an application that produced numerous notifications presented all its notifications as audio notifications. Such an inconvenient situation would almost guarantee that the user would have to go into the settings menu and manually adjust the delivery of audio notifications by that application to their liking. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, default applications deliver audio notifications for notifications designated as being high-priority notifications without delivering audio notifications for notifications that are not designated as being high-priority notifications (640). For example, when audio notifications by the default applications are enabled, the default applications, such as the Coffee Shop application discussed above with reference to FIG. 5K-1 to 5K-2, deliver audio notifications only for notifications that are designated as being high-priority notifications.

Enabling audio notifications for only high-priority notifications, by default further ensures that a user is provided with the best default experience without having to tailor the audio notifications to their preferences. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device enables (642) delivery of audio notifications associated with the first application (and/or the second application). For example, in accordance with a determination that the first application (and/or second application) differentiates high-priority notifications from lower-priority notifications, the electronic device enables delivery of audio notifications by the first application (and/or the second application).

In some embodiments, the electronic device enables (644) delivery of audio notifications by the first application (or the second application), and while the electronic device is outputting ongoing audio via the one or more wearable audio output devices (e.g., FIG. 5L at "Time Point A" 562-1 a song is playing as indicated by dialogue window 564-1 and pause button 566), the electronic device responds to an audio notification associated with the first application (or second application) being ready for delivery by: delivering the audio notification associated with the first application (or second application) via the one or more wearable audio output devices, and, while delivering the audio notification associated with the first application (or second application), interrupting (e.g., ceasing, pausing, reducing volume, etc.) output of the ongoing audio via the one or more wearable audio output devices. For example, FIG. 5L shows that, at "Time Point C" 562-3, the audio notification is being delivered, as indicated by dialogue box 564-3, and the song remains paused as indicated by play button 568). In some embodiments, in response to completing delivery of the audio notification via the one or more wearable audio output devices, the device resumes output of the ongoing audio (e.g., as shown in FIG. 5L at "Time Point D" 562-4 where the song resumes playing, as indicated by pause button 570 and dialogue window 564-4).

Interrupting ongoing audio to deliver a high-priority notification as an audio notification ensures that a user is notified about high-priority notifications, and helps to focus the user's attention on the audio notification. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device enables (646) delivery of audio notifications by the first application (or the second application), and while delivery of audio notifications by the first application (or second application) is enabled, the electronic device responds to an audio notification associated with the first application (or second application) being ready for delivery by: delivering an introductory sound, and after delivering the introductory sound, delivering the audio notification associated with the first application (or second application) via the one or more wearable audio output devices (e.g., as shown in FIG. 5L at "Time Point B" 562-2 the song stops playing, as indicated by play button 568, and an introductory sound is played/announced, as indicated by dialogue window 564-2, and at "Time Point C" 562-3, the audio notification is delivered, as indicated by dialogue box 564-3).

Having an introductory sound prior to an audio notification being delivered enhances the user experience as it informs the user that what they are about to hear next is an audio notification, and/or causes the user to focus on the audio being output by the one or more wearable audio output devices prior to the delivery of the audio notification, thereby increasing the likelihood that the user will pay attention to the audio notification. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device enables (648) delivery of audio notifications associated with the first application (and/or the second application), and while delivery of audio notifications associated with the first application (or second application) is enabled, the electronic device responds to an audio notification associated with the first application (or second application) being ready for delivery by (e.g., concurrently) delivering the audio notification associated with the first application and displaying, via the display generation component, a visual notification associated with the first application. In some embodiments, the audio notification is generated concurrently with the visual notification. In some embodiments, the audio notification is generated in conjunction with (e.g., shortly before or shortly after) the visual notification. For example, FIG. 5L illustrates at "Time Point B" 562-2 that a visual/textual notification 572 that is associated with the first application is displayed prior to delivery of the audio notification, and FIG. 5L also illustrates at "Time Point C" 526-3 that the visual/textual notification 572 is concurrently displayed while the audio notification is being announced.

Displaying a visual notification (e.g., a textual notification) associated with an audio notification allows the user more ways to process the same information. For example, if a user unable to comprehend the audio notification for any reason, they can look at the display visual notification to make sense of the audio notification they just heard. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a settings user interface (650), and method 600 includes the electronic device detecting a second input directed to another user interface element associated with the first application, wherein the first application is a communication application. In response to detecting the second input, the electronic device displays a notification control user interface associated with the first application, wherein the notification control user interface includes a plurality of selectable user interface elements, including one or more selectable user interface element for enabling delivery of audio notifications associated with the first application and meeting predefined criteria including filter criteria associated with at least one of: favorite entities (e.g., favorite contacts, saved locations, etc.), entities associated with recent communications, contacts associated with a user of the electronic device, or all entities (e.g., an option to allow notifications associate with all entities, e.g., everyone, or no filter). FIG. 5M-3, for example, illustrates that communications can be configured to allow audio notifications for messages from favorited contacts/entities, entities associated with recent communications, from contacts associated with a user of a portable multifunction device, and all entities (e.g., everyone).

Providing the option to the user to select filter criteria for controlling which notifications (e.g., notifications of received communications) will be delivered as audio notifications allows the user better tailor their audio notifications to their preferences. For example, a user may be inclined to only receive audio notifications associated with a communication application from their favorited contact (e.g., a significant other). Providing improved options for tailoring audio notifications in accordance with a user's preferences enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 6A-6E have been described is merely an example and is not intended to indicate that the described order is the only order in which the operations could be performed. One of ordinary skill in the art would recognize various ways to reorder the operations described herein.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device that is in communication with a display generation component and one or more wearable audio output devices:
   displaying, via the display generation component, a user interface that includes a user interface element for enabling delivery of audio notifications, via the one or more wearable audio output devices, wherein the audio notifications for which delivery is enabled are associated with a plurality of applications on the electronic device;
   detecting a first input directed to the user interface element; and
   in response to detecting the first input directed to the user interface element;
   in accordance with a determination that a first application of multiple applications differentiates high-priority notifications from lower-priority notifications, enabling delivery of audio notifications associated with the first application;
   in accordance with a determination that the first application does not differentiate high-priority notifications from lower-priority notifications, forgoing enabling delivery of audio notifications associated with the first application;
   in accordance with a determination that a second application of the multiple applications differentiates high-priority notifications from lower-priority notifications, enabling delivery of audio notifications from the second application; and
   in accordance with a determination that the second application does not differentiate high-priority notifications from lower-priority notifications, forgoing enabling delivery of audio notifications from the second application.

2. The method of claim 1, including: in response to detecting the first input directed to the user interface element, determining for each respective application of the multiple applications whether or not the respective application is permitted to deliver audio notifications.

3. The method of claim 1, including: in response to detecting the first input directed to the user interface element, in accordance with a determination that a third application of the multiple applications does not differentiate high-priority notifications from lower-priority notifications, forgoing enabling delivery of audio notifications by the third application.

4. The method of claim 1, wherein high-priority notifications include notifications that are identified by the first application as being time sensitive notifications.

5. The method of claim 1, wherein high-priority notifications are notifications identified by an application as having high priority.

6. The method of claim 1, including: after determining that the first application does not differentiate high-priority notifications from lower-priority notifications, and forgoing enabling delivery of audio notifications by the first application:
   detecting a second input directed to another user interface element associated with the first application; and in response to detecting the second input, enabling delivery of audio notifications for the first application.

7. The method of claim 1, wherein the user interface that includes the user interface element for enabling delivery of the audio notifications is a settings user interface for the electronic device.

8. The method of claim 1, wherein the user interface that includes the user interface element for enabling delivery of the audio notifications is displayed while setting up the one or more wearable audio output devices for use with the electronic device.

9. The method of claim 1, wherein the user interface is a settings user interface, and the method includes:
   detecting a second input directed to another user interface element associated with the first application; and
   in response to detecting the second input, displaying a notification control user interface associated with the first application, wherein displaying the notification control user interface includes concurrently displaying:
   a first user interface element for enabling delivery of a subset of notifications associated with the first application as audio notifications; and
   a second user interface element for enabling delivery of a larger set of notifications associated with the first application.

10. The method of claim 1, including: before displaying a user interface that includes a user interface element for enabling delivery of audio notifications via the one or more wearable audio output devices, displaying another user interface that includes a first user interface element for enabling a default set of applications to deliver audio notifications, and a second user interface element for selecting which applications are enabled to deliver audio notifications.

11. The method of claim 10, including: detecting an input at the second user interface element for selecting which applications deliver audio notifications user interface element; and in response to detecting the input at the second user interface element, displaying a user interface that includes respective user interface elements for enabling delivery of audio notifications for a plurality of different applications.

12. The method of claim 10, including: detecting an input at the first user interface element for enabling the default set of applications to deliver audio notifications; and in response to detecting the input at the first user interface element, enabling delivery of audio notifications for applications designated as default applications, wherein the default set of applications are applications that differentiate high-priority notifications from lower-priority notifications.

13. The method of claim 12, wherein default applications deliver audio notifications for notifications designated as being high-priority notifications without delivering audio notifications for notifications that are not designated as being high-priority notifications.

14. The method of claim 1, including: enabling delivery of audio notifications by the first application; and while the electronic device is outputting ongoing audio via the one or more wearable audio output devices, responding to an audio notification associated with the first application being ready for delivery by: delivering the audio notification associated with the first application via the one or more wearable audio output devices; and while delivering the audio notification associated with the first application, interrupting output of the ongoing audio via the one or more wearable audio output devices.

15. The method of claim 1, including:
   enabling delivery of audio notifications by the first application; and while delivery of audio notifications by the first application is enabled, responding to an audio notification associated with the first application being ready for delivery by: delivering an introductory sound; and after delivering the introductory sound, delivering the audio notification associated with the first application via the one or more wearable audio output devices.

16. The method of claim 1, including: enabling delivery of audio notifications associated with the first application; and while delivery of audio notifications associated with the first application is enabled, responding to an audio notification associated with the first application being ready for delivery by delivering the audio notification associated with the first application and displaying, via the display generation component, a visual notification associated with the first application.

17. The method of claim 1, wherein the user interface is a settings user interface, and the method includes:
   detecting a second input directed to another user interface element associated with the first application, wherein the first application is a communication application; and in response to detecting the second input, displaying a notification control user interface associated with the first application, wherein the notification control user interface includes a plurality of selectable user interface elements, including one or more selectable user interface element for enabling delivery of audio notifications associated with the first application and meeting predefined criteria including filter criteria associated with at least one of: favorite entities, entities associated with recent communications, contacts associated with a user of the electronic device, or all entities.

18. An electronic device that is in communication with a display generation component and one or more wearable audio output devices, comprising:
   one or more processors; and
   memory storing one or more programs, wherein the one or more programs are configured to be executed by the one or more processors, the one or more programs including instructions for:
   displaying, via the display generation component, a user interface that includes a user interface element for enabling delivery of audio notifications, via the one or more wearable audio output devices, wherein the audio notifications for which delivery is enabled are associated with a plurality of applications on the electronic device;

detecting a first input directed to the user interface element; and in response to detecting the first input directed to the user interface element;

in accordance with a determination that a first application of multiple applications differentiates high-priority notifications from lower-priority notifications, enabling delivery of audio notifications associated with the first application;

in accordance with a determination that the first application does not differentiate high-priority notifications from lower-priority notifications, forgoing enabling delivery of audio notifications associated with the first application;

in accordance with a determination that a second application of the multiple applications differentiates high-priority notifications from lower-priority notifications, enabling delivery of audio notifications from the second application; and in accordance with a determination that the second application does not differentiate high-priority notifications from lower-priority notifications, forgoing enabling delivery of audio notifications from the second application.

19. A non-transitory computer readable storage medium storing one or more programs, the one or more programs comprising instructions that, when executed by an electronic device that is in communication with a display generation component and one or more wearable audio output devices, cause the electronic device to:

display, via the display generation component, a user interface that includes a user interface element for enabling delivery of audio notifications, via the one or more wearable audio output devices, wherein the audio notifications for which delivery is enabled are associated with a plurality of applications on the electronic device;

detect a first input directed to the user interface element; and in response to detecting the first input directed to the user interface element;

in accordance with a determination that a first application of multiple applications differentiates high-priority notifications from lower-priority notifications, enable delivery of audio notifications associated with the first application;

in accordance with a determination that the first application does not differentiate high-priority notifications from lower-priority notifications, forgo enabling delivery of audio notifications associated with the first application;

in accordance with a determination that a second application of the multiple applications differentiates high-priority notifications from lower-priority notifications, enable delivery of audio notifications from the second application; and in accordance with a determination that the second application does not differentiate high-priority notifications from lower-priority notifications, forgo enabling delivery of audio notifications from the second application.

20. The electronic device of claim 18, wherein the one or more programs include instructions for:

in response to detecting the first input directed to the user interface element, determining for each respective application of the multiple applications whether or not the respective application is permitted to deliver audio notifications.

21. The electronic device of claim 18, wherein the one or more programs include instructions for:

in response to detecting the first input directed to the user interface element, in accordance with a determination that a third application of the multiple applications does not differentiate high-priority notifications from lower-priority notifications, forgoing enabling delivery of audio notifications by the third application.

22. The electronic device of claim 18, wherein high-priority notifications include notifications that are identified by the first application as being time sensitive notifications.

23. The electronic device of claim 18, wherein high-priority notifications are notifications identified by an application as having high priority.

24. The electronic device of claim 18, wherein the one or more programs include instructions for:

after determining that the first application does not differentiate high-priority notifications from lower-priority notifications, and forgoing enabling delivery of audio notifications by the first application:

detecting a second input directed to another user interface element associated with the first application; and in response to detecting the second input, enabling delivery of audio notifications for the first application.

25. The electronic device of claim 18, wherein the user interface that includes the user interface element for enabling delivery of the audio notifications is a settings user interface for the electronic device.

26. The electronic device of claim 18, wherein the user interface that includes the user interface element for enabling delivery of the audio notifications is displayed while setting up the one or more wearable audio output devices for use with the electronic device.

27. The electronic device of claim 18, wherein the user interface is a settings user interface, and the one or more programs include instructions for:

detecting a second input directed to another user interface element associated with the first application; and in response to detecting the second input, displaying a notification control user interface associated with the first application, wherein displaying the notification control user interface includes concurrently displaying:

a first user interface element for enabling delivery of a subset of notifications associated with the first application as audio notifications; and a second user interface element for enabling delivery of a larger set of notifications associated with the first application.

28. The electronic device of claim 18, wherein the one or more programs include instructions for:

before displaying a user interface that includes a user interface element for enabling delivery of audio notifications via the one or more wearable audio output devices, displaying another user interface that includes a first user interface element for enabling a default set of applications to deliver audio notifications, and a second user interface element for selecting which applications are enabled to deliver audio notifications.

29. The electronic device of claim 28, wherein the one or more programs include instructions for:

detecting an input at the second user interface element for selecting which applications deliver audio notifications user interface element; and in response to detecting the input at the second user interface element, displaying a user interface that includes respective user interface elements for enabling delivery of audio notifications for a plurality of different applications.

30. The electronic device of claim 28, wherein the one or more programs include instructions for:
   detecting an input at the first user interface element for enabling the default set of applications to deliver audio notifications; and
   in response to detecting the input at the first user interface element, enabling delivery of audio notifications for applications designated as default applications, wherein the default set of applications are applications that differentiate high-priority notifications from lower-priority notifications.

31. The electronic device of claim 30, wherein default applications deliver audio notifications for notifications designated as being high-priority notifications without delivering audio notifications for notifications that are not designated as being high-priority notifications.

32. The electronic device of claim 18, wherein the one or more programs include instructions for:
   enabling delivery of audio notifications by the first application; and
   while the electronic device is outputting ongoing audio via the one or more wearable audio output devices, responding to an audio notification associated with the first application being ready for delivery by:
      delivering the audio notification associated with the first application via the one or more wearable audio output devices; and
      while delivering the audio notification associated with the first application, interrupting output of the ongoing audio via the one or more wearable audio output devices.

33. The electronic device of claim 18, wherein the one or more programs include instructions for:
   enabling delivery of audio notifications by the first application; and
   while delivery of audio notifications by the first application is enabled, responding to an audio notification associated with the first application being ready for delivery by:
      delivering an introductory sound; and
      after delivering the introductory sound, delivering the audio notification associated with the first application via the one or more wearable audio output devices.

34. The electronic device of claim 18, wherein the one or more programs include instructions for:
   enabling delivery of audio notifications associated with the first application; and
   while delivery of audio notifications associated with the first application is enabled, responding to an audio notification associated with the first application being ready for delivery by delivering the audio notification associated with the first application and displaying, via the display generation component, a visual notification associated with the first application.

35. The electronic device of claim 18, wherein the user interface is a settings user interface, and the one or more programs include instructions for:
   detecting a second input directed to another user interface element associated with the first application, wherein the first application is a communication application; and
   in response to detecting the second input, displaying a notification control user interface associated with the first application, wherein the notification control user interface includes a plurality of selectable user interface elements, including one or more selectable user interface element for enabling delivery of audio notifications associated with the first application and meeting predefined criteria including filter criteria associated with at least one of: favorite entities, entities associated with recent communications, contacts associated with a user of the electronic device, or all entities.

36. The non-transitory computer readable storage medium of claim 19, wherein the one or more programs include instructions that when executed by the electronic device cause the electronic device to:
   in response to detecting the first input directed to the user interface element, determine for each respective application of the multiple applications whether or not the respective application is permitted to deliver audio notifications.

37. The non-transitory computer readable storage medium of claim 19, wherein the one or more programs include instructions that when executed by the electronic device cause the electronic device to:
   in response to detecting the first input directed to the user interface element, in accordance with a determination that a third application of the multiple applications does not differentiate high-priority notifications from lower-priority notifications, forgo enabling delivery of audio notifications by the third application.

38. The non-transitory computer readable storage medium of claim 19, wherein high-priority notifications include notifications that are identified by the first application as being time sensitive notifications.

39. The non-transitory computer readable storage medium of claim 19, wherein high-priority notifications are notifications identified by an application as having high priority.

40. The non-transitory computer readable storage medium of claim 19, wherein the one or more programs include instructions that when executed by the electronic device cause the electronic device to:
   after determining that the first application does not differentiate high-priority notifications from lower-priority notifications, and forgoing enabling delivery of audio notifications by the first application:
      detect a second input directed to another user interface element associated with the first application; and
      in response to detecting the second input, enable delivery of audio notifications for the first application.

41. The non-transitory computer readable storage medium of claim 19, wherein the user interface that includes the user interface element for enabling delivery of the audio notifications is a settings user interface for the electronic device.

42. The non-transitory computer readable storage medium of claim 19, wherein the user interface that includes the user interface element for enabling delivery of the audio notifications is displayed while setting up the one or more wearable audio output devices for use with the electronic device.

43. The non-transitory computer readable storage medium of claim 19, wherein the user interface is a settings user interface, and the one or more programs include instructions that when executed by the electronic device cause the electronic device to:
   detect a second input directed to another user interface element associated with the first application; and
   in response to detecting the second input, display a notification control user interface associated with the first application, wherein displaying the notification control user interface includes concurrently displaying:
a first user interface element for enabling delivery of a subset of notifications associated with the first application as audio notifications; and
a second user interface element for enabling delivery of a larger set of notifications associated with the first application.

44. The non-transitory computer readable storage medium of claim 19, wherein the one or more programs include instructions that when executed by the electronic device cause the electronic device to:
before displaying a user interface that includes a user interface element for enabling delivery of audio notifications via the one or more wearable audio output devices, display another user interface that includes a first user interface element for enabling a default set of applications to deliver audio notifications, and a second user interface element for selecting which applications are enabled to deliver audio notifications.

45. The non-transitory computer readable storage medium of claim 44, wherein the one or more programs include instructions that when executed by the electronic device cause the electronic device to:
detect an input at the second user interface element for selecting which applications deliver audio notifications user interface element; and
in response to detecting the input at the second user interface element, display a user interface that includes respective user interface elements for enabling delivery of audio notifications for a plurality of different applications.

46. The non-transitory computer readable storage medium of claim 44, wherein the one or more programs include instructions that when executed by the electronic device cause the electronic device to:
detect an input at the first user interface element for enabling the default set of applications to deliver audio notifications; and
in response to detecting the input at the first user interface element, enable delivery of audio notifications for applications designated as default applications, wherein the default set of applications are applications that differentiate high-priority notifications from lower-priority notifications.

47. The non-transitory computer readable storage medium of claim 46, wherein default applications deliver audio notifications for notifications designated as being high-priority notifications without delivering audio notifications for notifications that are not designated as being high-priority notifications.

48. The non-transitory computer readable storage medium of claim 19, wherein the one or more programs include instructions that when executed by the electronic device cause the electronic device to:
enable delivery of audio notifications by the first application; and
while the electronic device is outputting ongoing audio via the one or more wearable audio output devices, respond to an audio notification associated with the first application being ready for delivery by:
delivering the audio notification associated with the first application via the one or more wearable audio output devices; and
while delivering the audio notification associated with the first application, interrupting output of the ongoing audio via the one or more wearable audio output devices.

49. The non-transitory computer readable storage medium of claim 19, wherein the one or more programs include instructions that when executed by the electronic device cause the electronic device to:
enable delivery of audio notifications by the first application; and
while delivery of audio notifications by the first application is enabled, respond to an audio notification associated with the first application being ready for delivery by:
delivering an introductory sound; and
after delivering the introductory sound, delivering the audio notification associated with the first application via the one or more wearable audio output devices.

50. The non-transitory computer readable storage medium of claim 19, wherein the one or more programs include instructions that when executed by the electronic device cause the electronic device to:
enable delivery of audio notifications associated with the first application; and
while delivery of audio notifications associated with the first application is enabled, respond to an audio notification associated with the first application being ready for delivery by delivering the audio notification associated with the first application and displaying, via the display generation component, a visual notification associated with the first application.

51. The non-transitory computer readable storage medium of claim 19, wherein the one or more programs include instructions that when executed by the electronic device cause the electronic device to:
detect a second input directed to another user interface element associated with the first application, wherein the first application is a communication application; and
in response to detecting the second input, display a notification control user interface associated with the first application, wherein the notification control user interface includes a plurality of selectable user interface elements, including one or more selectable user interface element for enabling delivery of audio notifications associated with the first application and meeting predefined criteria including filter criteria associated with at least one of: favorite entities, entities associated with recent communications, contacts associated with a user of the electronic device, or all entities.

* * * * *